United States Patent
Zhou et al.

(10) Patent No.: US 11,550,406 B1
(45) Date of Patent: Jan. 10, 2023

(54) INTEGRATION OF A TWO-DIMENSIONAL INPUT DEVICE INTO A THREE-DIMENSIONAL COMPUTING ENVIRONMENT

(71) Applicant: AUTODESK, INC., San Francisco, CA (US)

(72) Inventors: Qian Zhou, Toronto (CA); Fraser Anderson, Camrose (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 17/501,351

(22) Filed: Oct. 14, 2021

(51) Int. Cl.
  *G06F 3/0346* (2013.01)
  *G02B 30/50* (2020.01)
  *G06F 3/038* (2013.01)
  *G06T 19/00* (2011.01)

(52) U.S. Cl.
  CPC .......... *G06F 3/0346* (2013.01); *G02B 30/50* (2020.01); *G06F 3/038* (2013.01); *G06T 19/006* (2013.01)

(58) Field of Classification Search
  CPC ....... G06F 3/0346; G06F 3/038; G02B 30/50; G06T 19/006
  See application file for complete search history.

(56) References Cited

U.S. PATENT DOCUMENTS

| | | | |
|---|---|---|---|
| 6,115,028 A * | 9/2000 | Balakrishnan | .......... G06F 3/046 345/157 |
| 2007/0247425 A1* | 10/2007 | Liberty | .................. G06F 3/017 345/158 |
| 2007/0253618 A1 | 11/2007 | Kim et al. | |
| 2012/0030630 A1 | 2/2012 | Grossman et al. | |
| 2013/0127844 A1 | 5/2013 | Koeppel et al. | |
| 2013/0342453 A1 | 12/2013 | Lee et al. | |
| 2014/0018167 A1 | 1/2014 | Golli | |

(Continued)

FOREIGN PATENT DOCUMENTS

JP   2004-362218 A   12/2004

OTHER PUBLICATIONS

Ware et al., "Selection Using a One-Eyed Cursor in a Fish Tank VR Environment", ACM Transactions on Computer-Human Interaction, vol. 4, No. 4, Dec. 1997, 14 pp. 309-322.

(Continued)

*Primary Examiner* — Premal R Patel
(74) *Attorney, Agent, or Firm* — Artegis Law Group, LLP

(57) ABSTRACT

A workstation enables operation of a 2D input device with a 3D interface. A cursor position engine determines the 3D position of a cursor controlled by the 2D input device as the cursor moves within a 3D scene displayed on a 3D display. The cursor position engine determines the 3D position of the cursor for a current frame of the 3D scene based on a current user viewpoint, a current mouse movement, a CD gain value, a Voronoi diagram, and an interpolation algorithm, such as the Laplacian algorithm. A CD gain engine computes CD gain optimized for the 2D input device operating with the 3D interface. The CD gain engine determines the CD gain based on specifications for the 2D input device and the 3D display. The techniques performed by the cursor position engine and the techniques performed by the CD gain engine can be performed separately or in conjunction.

20 Claims, 9 Drawing Sheets

(56) References Cited

U.S. PATENT DOCUMENTS

| | | | |
|---|---|---|---|
| 2018/0046352 A1 | 2/2018 | Johnson et al. | |
| 2021/0191600 A1* | 6/2021 | Lemay | G06F 3/0304 |
| 2021/0295602 A1* | 9/2021 | Scapel | G06T 7/70 |
| 2021/0333884 A1* | 10/2021 | Li | G06F 3/013 |

OTHER PUBLICATIONS

Teather et al., "Pointing at 3D Target Projections with One-Eyed and Stereo Cursors", Session: 3D User Interfaces, CHI 2013: Changing Perspectives, Paris, France, Apr. 27-May 2, 2013, 10 pages.

Schemali et al., "Design and Evaluation of Mouse Cursors in a Stereoscopic Desktop Environment", IEEE 3DUI, 67-70, Jul. 21, 2014, 4 pages.

Gervais, et al., "Pointing in Spatial Augmented Reality from 2D Pointing Devices", Interact. 9299, Sep. 2015, 10 pp. 381-389.

Lee et al., "Binocular Cursor: Enabling Selection on Transparent Displays Troubled by Binocular Parallax", Session: Spatial Interfaces, CHI 2013: Changing Perspectives, Paris, France, Apr. 27-May 2, 2013, 4 pp. 3169-3172.

Nacenta et al., "Perspective Cursor: Perspective-Based Interaction for Multi-Display Environments", CHI 2006 Proceedings, Multidisplay Environments Apr. 22-27, 2006 • Montréal, Quebec, Canada, 10 pages.

Xiao et al., "Ubiquitous cursor: A comparison of direct and indirect pointing feedback in multi-display environments", Graphics Interface Conference, St. John's, Newfoundland, Canada, May 25-27, 2011, 8 pp. 135-142.

Waldner et al., "Automatic Configuration of Spatially Consistent Mouse Pointer Navigation in Multi-Display Environments" IUI'10, Feb. 7-10, 2010, Hong Kong, China, 4 pages.

Gervais et al., "Tangible Viewports: Getting Out of Flatland in Desktop Environments", TEI 2016, Feb. 14-17, 2016, Eindhoven, Netherlands, 9 pages.

Casiez et al., "The Impact of Control-Display Gain on User Performance in Pointing Tasks", Human-Computer Interaction, 2008, vol. 23, 37 pp. 215-250.

Nancel et al., "Mid-Air Pointing on Ultra-Walls", ACM Transactions on Computer-Human Interaction, vol. 22, No. 5, Atricle 21, Publication date: Aug. 2015, 62 pages.

Mehmet Celal Dasiyici, "Multi-Scale Cursor: Optimizing Mouse Interaction for Large Personal Workspaces", Thesis submitted to the Faculty of the Virginia Polytechnic Institute and State University, May 8, 2008, 104 pages.

Frees et al., "Precise and Rapid Interaction through Scaled Manipulation in Immersive Virtual Environments", IEEE Virtual Reality 2005, Mar. 12-16, Bonn, Germany, 9 pages.

Ramcharitar et al., "EZCursorVR: 2D Selection with Virtual Reality Head-Mounted Displays" Graphics Interface Conference, May 8-11, 2018, Toronto, Ontario, Canada, 8 pages.

Kim et al., "VRMouse: Mouse Emulation with the VR Controller for 2D Selection in VR", Human Factors and Ergonomics Lab, Department of Industrial and Systems Engineering, Korea Advanced Institute of Science and Technology, AHFE 2020, AISC 1217, https://doi.org/10.1007/978-3-030-51828-8_87, 8 pages, 663-670.

Non Final Office Action received for U.S. Appl. No. 17/501,337 dated Nov. 2, 2022, 23 pages.

\* cited by examiner

INTEGRATION OF A TWO-DIMENSIONAL INPUT DEVICE INTO A THREE-DIMENSIONAL COMPUTING ENVIRONMENT

BACKGROUND

Field of the Various Embodiments

The various embodiments relate generally to computer science virtual reality technology and, more specifically, to integration of a two-dimensional input device into a three-dimensional computing environment.

Description of the Related Art

A two-dimensional (2D) computing environment is provided by a traditional 2D interface, such as a desktop interface. A three-dimensional (3D) computing environment is provided by a 3D interface, such as a virtual-reality (VR) interface or augmented-reality (AR) interface. Computer-based productive work, such as software application workflows and tasks, is typically performed via a 2D interface. However, performing productive work via a 3D interface is becoming increasingly popular due to the distinct advantages provided by 3D interfaces. For example, when performing productive work within a 3D design application, a 3D interface provides the user an immersive experience that allows a better sense of space and scale relative to a traditional 2D interface.

However, performing product work via a 3D interface also has disadvantages relative to a traditional 2D interface. In particular, a traditional 2D input device, such as a mouse or trackball, typically has a higher level of precision and accuracy than a 3D controller, such as a VR controller. A traditional 2D input device also is usually less fatiguing to users over extended periods of time relative to a 3D controller. Given the advantages of the traditional 2D input device over 3D controllers, users sometimes interact with the 3D user interface via a 2D input device when performing productive work within the 3D environment, such as for interacting with 2D planar windows in the 3D environment.

Conventional approaches for integrating 2D input devices with 3D interfaces do not provide depth continuity of the cursor controlled by the 2D input device as the cursor moves through the 3D environment. In particular, in conventional approaches, a cursor controlled by a 2D input device oftentimes jumps to different depths in an inconsistent manner when the cursor moves between objects in the 3D environment. Consequently, with conventional approaches, the depth and 3D position of the cursor is usually rendered and displayed in an irregular and inconsistent manner as the cursor moves through the 3D environment.

In addition, conventional approaches do not provide a control display (CD) gain that is optimized for a 2D input device utilized with a 3D interface. The CD gain defines a particular amount of cursor movement within the 3D environment resulting from a given amount of physical movement of the 2D input device. A CD gain that is set too low can result in over-clutching of the 2D input device; whereas, a CD gain that is set too high can reduce the precision of the 2D input device. Currently, conventional approaches provide CD gains that are either too low or too high when a 2D input device is utilized with a 3D interface, thereby causing 2D input device to either over-clutch or lack precision.

As the foregoing illustrates, what is needed in the art are more effective techniques for integrating 2D input devices into 3D computing environments.

SUMMARY

Various embodiments include a computer-implemented method for determining a cursor position within a three-dimensional (3D) scene. The computer-implemented method includes generating a final cursor ray pointing to a cursor for a current frame of the 3D scene based on a current user viewpoint and a current input movement of a two-dimensional (2D) input device that controls the cursor. The computer-implemented method also includes determining that one or more objects within the 3D scene are natural neighbors of the cursor. The computer-implemented method also includes determining a depth of the final cursor ray based on the one or more objects. The computer-implemented method further includes displaying the current frame of the 3D scene, wherein the current frame that is displayed includes the cursor located at a 3D position within the 3D scene that is determined based on the final cursor ray and the depth of the final cursor ray.

At least one technical advantage of the disclosed techniques relative to the prior art is that the disclosed techniques enable a 2D input device to be seamlessly integrated within a 3D environment. Among other things, the disclosed techniques continually determine a depth of a cursor controlled by the 2D input device for each frame of a 3D environment displayed on a 3D display (such as a VR or AR headset). The depth of the cursor is determined based on locations of one or more 3D objects currently displayed within the 3D environment. In this manner, the disclosed techniques provide depth continuity of the cursor within the 3D environment, which enables smooth and continuous object selection and movement of the cursor within the 3D environment. Accordingly, the disclosed techniques improve the efficiency with which users perform productive work and improve the overall user-experience relative to prior art systems. These technical advantages represent one or more technological improvements over prior art approaches.

Various embodiments include a computer-implemented method for optimizing a control-display (CD) gain for a two-dimensional (2D) input device operating with a three-dimensional (3D) display. The computer-implemented method includes determining a minimum object size displayable by the 3D display based on at least one specification of the 3D display. The computer-implemented method also includes determining a range of CD gain values based on the minimum object size, at least one specification the 2D input device, and the at least one specification of the 3D display. The computer-implemented method also includes selecting a CD gain value within the range of CD gain values. The computer-implemented method further includes determining a 3D position of a cursor within a 3D scene displayed on the 3D display based on the CD gain value, wherein the cursor is controlled by the 2D input device.

At least one technical advantage of the disclosed techniques relative to the prior art is that the disclosed techniques provide a control display (CD) gain that is optimized for a 2D input device utilized in a 3D interface. The optimized CD gain is determined based on specifications for the 2D input device and the 3D display (such as a VR or AR headset) that displays the 3D environment. Thus, the disclosed techniques provide a CD gain that reduces over-clutching of the 2D input device while maintaining a satisfactory level of precision of the 2D input device. In this manner, the disclosed techniques enable more efficient and accurate object selection and movement of the cursor within the 3D environment. Accordingly, the disclosed techniques improve the effectiveness with which users can perform productive work within 3D environments and improve the overall user-experience relative to prior art systems. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
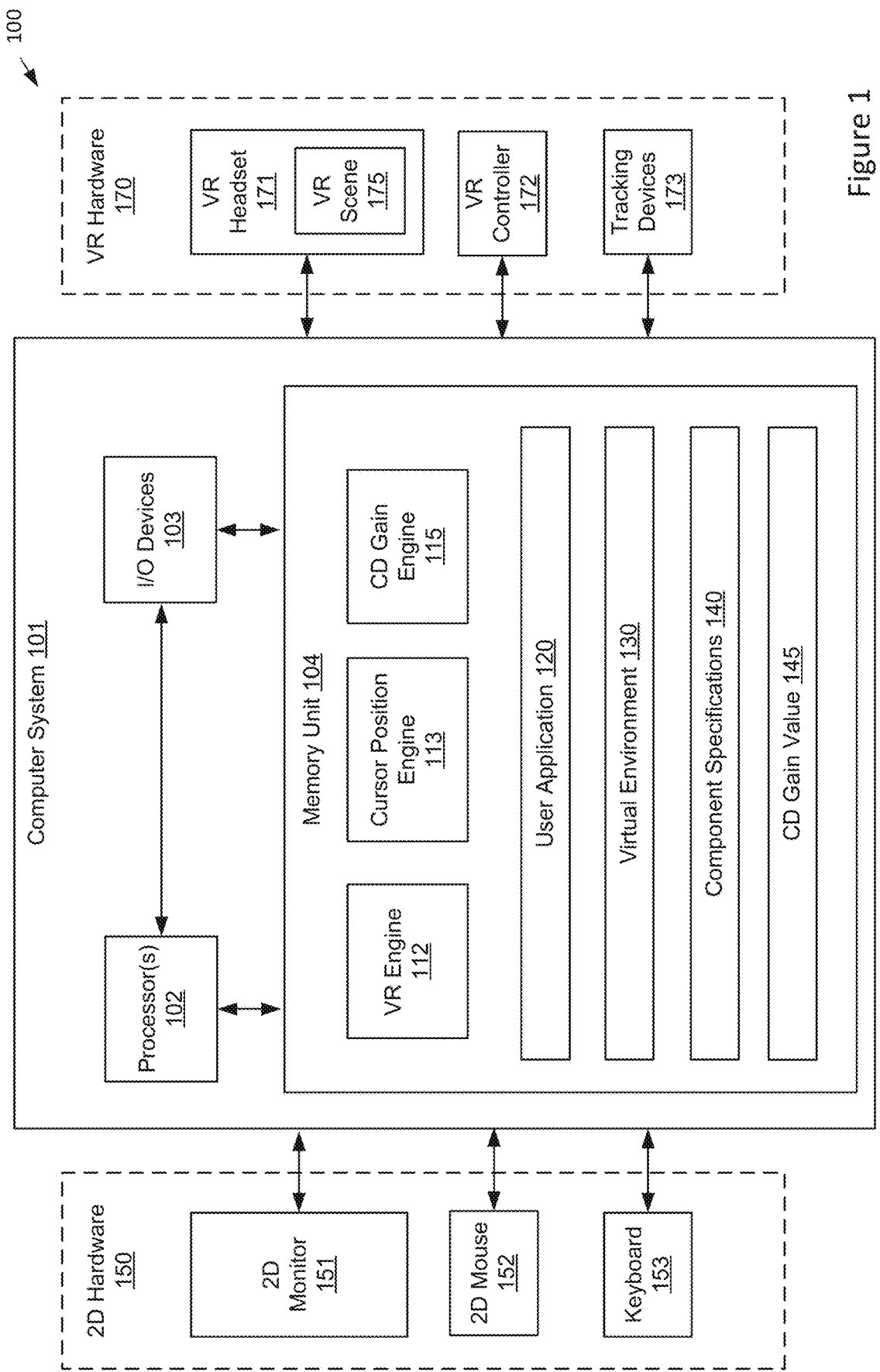
FIG. 1 illustrates a workstation configured to implement one or more aspects of the various embodiments.

In the following description, numerous specific details are set forth to provide a more thorough understanding of the various embodiments. However, it will be apparent to one of skilled in the art that the inventive concepts can be practiced without one or more of these specific details.

As used herein, a "3D interface" comprises 3D-specific hardware and software components. For example, 3D hardware can include a 3D display, one or more 3D controllers that operate in 3D, one or more tracking devices, and one or more cameras. For example, 3D software can include a 3D application/engine that generates a 3D environment and renders a 3D scene displayed on a 3D display. The 3D scene comprises a particular view of the 3D environment. Examples of 3D interfaces include a virtual-reality (VR) interface and an augmented-reality (AR) interface. Examples of 3D displays include a VR headset and an AR headset.

As used herein, a "VR interface" comprises VR-specific hardware and software components. For example, VR hardware can include a VR headset, one or more VR controllers, and one or more tracking devices. For example, VR software can include a VR application/engine that generates a 3D virtual environment and renders a VR scene displayed on a VR headset. The VR scene comprises particular view of the 3D virtual environment that includes various 3D virtual objects. Although the below embodiments relate to a VR interface, the disclosed techniques can also apply to an AR interface, as discussed below in Section IV.

As used herein, a "2D interface" can comprise 2D-specific hardware and software components, such as traditional desktop hardware and software components. 2D hardware can include a 2D monitor and a 2D input device (such as a 2D mouse and/or trackball). 2D software can include a 2D application/engine that generates a 2D user interface (UI) that is displayed on the 2D monitor.

As used herein, a "3D environment" comprises a computer-generated simulated environment that includes one or more selectable 3D objects. The 3D display can display a 3D scene (such as a VR scene or AR scene) comprising a particular view of the 3D environment, depending on the position/location of the user viewpoint within the 3D environment. Examples of a 3D environment include a virtual environment generated by a VR interface and an augmented environment generated by an AR interface.

As used herein, a "user application" comprises any 3D-based application, such as a 3D design application, 3D gaming application, and the like.

The description provided herein is divided into four sections. Section I includes a description of a system that utilizes a 2D input device with a 3D interface. Section II includes a description of techniques for determining a depth-continuous position of a cursor controlled by the 2D input device within a 3D environment. Section III includes a description of techniques for calculating a CD gain that is optimized for a 2D input device utilized with a 3D interface. Note that the techniques disclosed in Section II and the techniques disclosed in Section III can be performed separately and independently, or can be performed in conjunction. Section IV includes a description of an alternative embodiment that implements an AR interface.

System Overview

FIG. 1 illustrates a workstation 100 configured to implement one or more aspects of the various embodiments. As shown, the workstation 100 includes, without limitation, a computer system 101 connected to various 2D hardware 150 and various VR hardware 170. The computer system 101 can comprise at least one processor 102, input/output (I/O) devices 103, and a memory unit 104 coupled together. The computer system 101 can comprise a server, personal computer, laptop or tablet computer, mobile computer system, or any other device suitable for practicing various embodiments described herein.

In general, a processor 102 can be any technically feasible processing device or hardware unit capable of processing data and executing software applications and program code. The processor 102 executes the software and performs the functions and operations set forth in the embodiments described herein. For example, a processor 102 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 104 can include a hard disk, a random access memory (RAM) module, a flash memory unit, or any other type of memory unit or combination thereof. Processor 102 and I/O devices read data from and write data to memory 104. The memory unit 104 stores software application(s) and data. Instructions from the software constructs within the memory unit 104 are executed by processors 102 to enable the inventive operations and functions described herein.

I/O devices 103 are also coupled to memory 104 and can include devices capable of receiving input as well as devices capable of providing output. The I/O devices 103 can include input and output devices not specifically listed in the 2D hardware 150 and VR hardware 170, such as a network card for connecting with a network, a speaker, a fabrication device (such as a 3D printer), and so forth. Additionally, I/O devices can include devices capable of both receiving input and providing output, such as a touchscreen, a universal serial bus (USB) port, and so forth.

The computer system 101 is connected to various 2D hardware 150, including a 2D monitor 151, 2D mouse 152, and a keyboard 153. The 2D monitor 151 can comprise a conventional/traditional flat display that displays 2D images (such as 2D windows and user interfaces). The 2D mouse 152 can comprise a traditional 2-Degree of Freedom input device that operates in 2D along a flat/horizontal surface, such as a desk. Although some embodiments described herein relate to a 2D mouse 152, the disclosed techniques can also apply to other 2D input devices, such as a trackball.

The computer system 101 is also connected to various VR hardware 170, including a VR headset 171, a VR controller 172, and one or more tracking devices 173. The VR controller 172 comprises a VR-tracked device that is tracked by the tracking devices 173 that determine 3D position/location information for the VR controller 172. The VR controller 172 comprises a 6-Degree of Freedom (6DOF) controller that operates in 3D, which can be less precise and more tiring to operate than the 2D mouse 152 which operates in 2D. The VR headset 171 can display images in 3D stereo images (such as the VR scene 175). The VR headset 171 comprises a VR-tracked device that is tracked by the tracking devices 173 that can determine 3D position/location information for the VR headset 171. In some embodiments, the tracking devices 173 track a 3D position of a user viewpoint by tracking the 3D position of the VR headset 171. Although the below embodiments describe a VR interface, the disclosed techniques can also apply to an AR interface, as discussed below in Section IV.

The memory unit 104 stores a VR engine 112, a cursor position engine 113, a CD gain engine 115, a user application 120, a virtual environment 130, component specifications 140, and a CD gain value 145. Although shown as separate software components, VR engine 112, a cursor position engine 113, and/or CD gain engine 115 can be integrated into a single software component. For example, in other embodiments, the cursor position engine 113 and/or CD gain engine 115 can be integrated with the VR engine 112. In further embodiments, the user application 120, cursor position engine 113, and/or CD gain engine 115 can be stored and executed on the VR Headset 171.

The user application 120 can comprise, for example, a 3D design application for creating, modifying, and interacting with the virtual environment 130. In other embodiments, the user application 120 can comprise any other type of 3D-based application, such as a 3D video game, a 3D data analysis application, and the like. The virtual environment 130 can comprise a 3D virtual environment stored, for example, as data describing a current scene (such as the 3D position/location, orientation, and details of virtual objects), data describing a user viewpoint (3D position/location and orientation) in the virtual environment, data pertinent to the rendering of the virtual scene (such as materials, lighting, and virtual camera location), and the like.

The VR engine 112 renders a VR scene 175 comprising a 3D representation of the virtual environment 130. The VR scene 175 is displayed on the VR headset 171. The user can interact with the virtual environment 130 for performing productive work (such as workflows or tasks) in the user application 120 via the VR scene 175 and VR hardware 170. For example, the user can navigate within the virtual environment 130 or perform workflows or tasks within the virtual environment 130 using one or more VR controllers 172. Meanwhile, the VR scene 175 displayed on the VR headset 171 provides visual feedback to the user to assist in performing the workflows or tasks within the virtual environment 130.

The VR interface provides the user an immersive experience that allows a better sense of space and scale relative to the 2D interface. However, the VR controller 172 operates in 3D, which can become tiring after prolonged periods. In comparison, the 2D input devices of the 2D interface can allow for more accuracy and precision in performing certain tasks and is less fatiguing during extended use. Therefore, it is becoming more popular for a user to use the 2D input device when performing productive work within the virtual environment 130 and VR scene 175. In this regard, the workstation 100 includes a cursor position engine 113 and a CD gain engine 115 that seamlessly integrate use of a 2D input device within the 3D virtual environment 130 for improving user efficiency and the overall user experience when interacting with the virtual environment 130 and VR scene 175 using the 2D input device.

In some embodiments, the CD gain engine 115 is implemented to calculate an optimized CD gain for the particular 2D input device used with a particular VR headset 171 that displays a VR scene 175. The CD gain value 145 can be calculated based on specifications of the 2D input device and the VR headset 171 (that can be received and stored to memory 104 as component specifications 140). The calculated CD gain value 145 can be stored to memory 104 and used by the cursor position engine 113 to determine a 3D cursor position. In other embodiments, the calculated CD gain value 145 can be used by any other type of 3D engine that determines a location of a cursor controlled by a 2D input device within a 3D scene.

In some embodiments, the cursor position engine 113 provides depth continuity of the cursor, which enables smooth and continuous object selection and movement of the cursor as the cursor moves within the 3D environment. In particular, the cursor position engine 113 is implemented to determine a 3D cursor position via a cursor ray and an interpolation technique that interpolates the 3D cursor position based on selectable virtual objects within a current VR scene 175. The cursor position engine 113 continually determines the 3D position/location of the cursor for each frame of the VR scene 175 based on several factors, including a control-display (CD) gain 145 which can comprise a predetermined default value or a calculated value determined by the CD gain engine 115.

Figure 2:
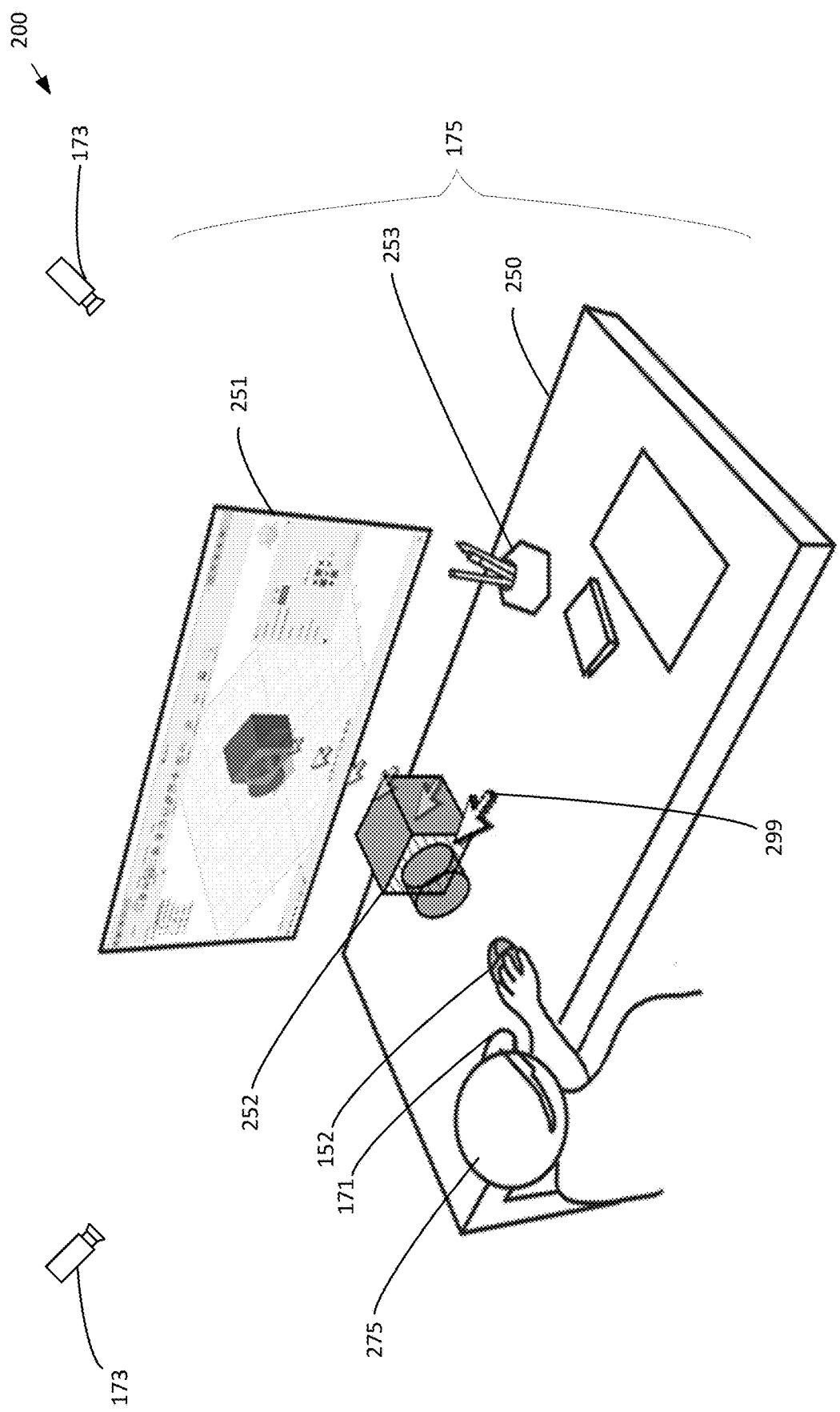
FIG. 2 illustrates a workstation environment in which the workstation of FIG. 1 can operate, according to various embodiments.

FIG. 2 illustrates a workstation environment 200 in which the workstation 100 of FIG. 1 can operate, according to various embodiments. As shown, the workstation environment 200 includes, without limitation, a user 275, a physical desk 250, a 2D mouse 152, and various VR hardware 170 including a VR headset 171 and one or more tracking devices 173.

The VR headset 171 displays a VR scene 175 comprising a plurality of selectable 3D virtual objects, including a virtual monitor 251, a virtual box 252, and a virtual pen holder 253. In alternative embodiments, the VR headset 171 can also render the user 275 as a virtual user, the physical desk 250 as a virtual desk, and/or the 2D mouse 152 as a virtual mouse within the VR scene 175. The VR headset 171 also renders a graphical image/representation of a cursor 299 controlled by the 2D mouse 152 within the VR scene 175. FIG. 2 illustrates the movement of the cursor 299 from the virtual monitor 251 to the virtual box 252. In some embodiments, the cursor position engine 113 continually determines the 3D location of the cursor 299 for each frame of the VR scene 175 so that the cursor 299 is rendered with depth continuity as the cursor 299 moves between various objects of the VR scene 175, as illustrated in FIG. 2.

The tracking devices 173 can track the 3D position/location of any of the visible items and components within the workstation environment 200, including the VR headset 171. In general, the tracking devices 173 generate 3D space information (tracking data) for visible items and components within the workstation environment 200 which can indicate the location and orientation of the visible items and components. In this manner, the tracking devices 173 can track the current viewpoint of the user 275 by tracking the VR headset 171, whereby the 3D location and orientation of the user viewpoint can comprise the 3D location and orientation of the tracked VR headset 171. Each tracking device 173 can include various components (not shown) for performing the above-described functions of the tracking device 173. For example, each tracking device 173 can include a spatial tracker receiver that communicates with a spatial capture camera, such as a Kinect 3D scanner. The spatial capture camera can generate 3D space information for the workstation environment 200, and the spatial tracker receiver can communicate the 3D space information to the VR engine 112 and the cursor position engine 113. The embodiments shown in FIG. 2 illustrate "outside-in" tracking. In other embodiments, the tracking devices 173 can be integrated with the VR headset 171 to implement "inside-out" tracking. In some embodiments, the cursor position engine 113 receives the tracking data (3D space information) generated by the tracking devices 173 to perform the embodiments described herein.

When integrating a 2D input device for operation within a 3D environment, such as the VR scene 175, several integration issues/problems can arise. In particular, three general problems can arise comprising the diplopia problem, the perspective problem, and the sensitivity problem. The three general problems can be an issue in various types of display environments, but is of particular concern in 3D display environments.

The diplopia problem (double-vision problem) occurs when the user is simultaneously viewing two items at different depths from each other. For example, assume the virtual box 252 and the cursor 299 are displayed at different depths/distances from the user 275. When the user 275 focuses his/her vision on the virtual box 252, the user 275 will see two cursors 299 instead of one cursor 299. When the user 275 focuses his/her vision on the cursor 299, the user 275 will see two virtual boxes 252 instead of one virtual box 252. The diplopia problem worsens when the difference in the depths of the two items increases. Thus, if the user 275 is attempting to select the virtual box 252 with the cursor 299 by moving the cursor 299 towards the virtual box 252, the diplopia problem will occur unless the depths of the virtual box 252 and the cursor 299 are aligned and similar.

The perspective problem relates to the different/inconsistent mouse movements that are needed to move the cursor 299 from a first item to a second item within the 3D environment depending on the perspective (viewpoint) of the user 275. For example, to move the cursor 299 from the virtual monitor 251 to the virtual box 252 will require different/inconsistent physical movements of the 2D mouse 152 depending on the position of the user viewpoint. This is due to the fact that the user 275 will perceive the position of the virtual monitor 251 relative to the position of the virtual box 252 to be different with different positions of the user viewpoint, thereby requiring different physical movements of the 2D mouse 152 to move the cursor 299 from the virtual monitor 251 to the virtual box 252. In particular, the perspective problem occurs when 2D interaction techniques are applied in a 3D environment without considering the perspective/viewpoint of the user.

The sensitivity problem relates to a control display (CD) gain for a particular input device and a particular display environment. The CD gain defines a ratio between an amount of cursor movement within the display environment and an amount of physical movement of the input device. In particular, the CD gain defines a ratio for a particular amount of cursor movement within the display environment that results from a particular amount of physical movement of the input device. A CD gain that is set too low can result in over-clutching of the input device. Clutching of the input device refers to when the input device reaches one end of a designated deskspace (made available for moving the input device), which requires the input device to be picked up and moved to the other end of the designated deskspace to continue moving the input device. However, setting a CD gain too high can result in a lack of precision of the input device. The sensitivity problem occurs when a 2D input device is used within a 3D environment without optimizing the CD gain of the 2D input device for the 3D environment.

Conventional approaches have not resolved the diplopia problem, the perspective problem, and the sensitivity problem when integrating a 2D input device for use with a 3D environment. In some embodiments, the disclosed techniques address the diplopia problem by providing depth continuity of the cursor when the cursor is moved between objects of the 3D environment. In this manner, as the cursor moves closer to a particular object, the depths of the cursor and the particular object become aligned and similar in value, which mitigates the diplopia problem. In some embodiments, the disclosed techniques also address the perspective problem by determining the depth of the cursor using a cursor ray that is based on the user viewpoint. In this manner, the disclosed techniques address the perspective problem by considering the user perspective when determining and displaying the 3D position of the cursor in the 3D environment. The techniques that address the diplopia problem and the perspective problem are discussed below in Section II in regards to the cursor position engine 113.

In some embodiments, the disclosed techniques further address the sensitivity problem by determining a CD gain that is optimized for a particular 2D input device that is utilized with a particular 3D display. The optimized CD gain is determined based on specifications for the 2D input device and the 3D display. The techniques that address the sensitivity problem are discussed below in Section III in regards to the CD gain engine 115.

Depth-Continuous Position of the Cursor

In some embodiments, the cursor position engine 113 continually determines the 3D position of a cursor controlled by a 2D input device as the cursor moves within a VR scene 175 of a virtual environment 130. The VR scene 175 is rendered by the VR engine 112 and displayed on the VR headset 171. In these embodiments, the cursor position engine 113 determines the 3D position of the cursor for each frame of the rendered VR scene 175 to provide depth continuity of the cursor as the cursor moves between virtual objects within the VR scene 175. In addition, the cursor position engine 113 determines the 3D position of the cursor for a current frame based, at least in part, on a current user viewpoint within the VR scene 175. In this manner, the cursor position engine 113 addresses both the diplopia problem and the perspective problem discussed above in Section I, which enables continuous and consistent object selection and movement of the cursor within the VR scene 175.

In general, for each current frame of the rendered VR scene 175, the cursor position engine 113 performs a set of operations to determine the 3D position of the cursor. First, the cursor position engine 113 receives a previous cursor ray RP that is determined for a previous frame that is just prior to the current frame. The previous cursor ray RP originates at a previous user viewpoint and points in the direction of the previous cursor position in the previous frame of the VR scene 175. The cursor ray is specified in spherical coordinates.

The cursor position engine 113 then updates the origin of the previous cursor ray RP based on the current user viewpoint to generate an initial cursor ray R0 for the current frame. For example, the current user viewpoint can be determined via tracking data of the VR headset 171. Thus, the cursor position engine 113 generates an initial cursor ray R0 within the VR scene 175 that originates at the current user viewpoint and points in the direction of the previous cursor position in the previous frame of the VR scene 175.

The cursor position engine 113 then updates the direction of the initial cursor ray R0 based on a current mouse movement to generate a final cursor ray R1 for the current frame. In particular, an amount of angular movement (delta motion) is determined based on a current movement of the 2D input device (delta movement) and the CD gain value associated with the 2D input device. The CD gain value can be a default value or a value that is calculated by the CD gain engine 115. The delta motion is then added to the initial cursor ray R0 to generate the final cursor ray R1 for the current frame. Thus, the cursor position engine 113 generates a final cursor ray R1 within the VR scene 175 that originates at the current user viewpoint and points in the direction of the current cursor position for the current frame of the VR scene 175.

Once the direction of the final cursor ray R1 for the current frame is determined, the cursor position engine 113 then determines the depth of the final cursor ray R1. To do so, the cursor position engine 113 casts the final cursor ray R1 into the VR scene 175 to determine if the final cursor ray R1 intersects with any selectable virtual objects within the VR scene 175. If the final cursor ray R1 intersects with a selectable virtual object, the depth of the final cursor ray R1 is set to equal the depth of the intersected selectable virtual object.

However, if the final cursor ray R1 does not intersect any selectable virtual objects within the VR scene 175, the cursor position engine 113 performs an interpolation technique based on one or more selectable virtual objects within the current VR scene 175 to determine an interpolated depth of the final cursor ray R1. In some embodiments, the interpolation technique is performed to determine a set of natural neighbors of the cursor based on a Voronoi diagram. The set of natural neighbors of the cursor corresponds to a particular set of selectable objects within the current VR scene 175. In some embodiments, the set of selectable objects comprises a subset of all selectable objects within the VR scene 175. In some embodiments, the set of selectable objects comprises two or more selectable objects within the VR scene 175. The interpolation technique then applies an interpolation algorithm, such as the Laplacian interpolation algorithm, to the set of natural neighbors to compute the depth of the final cursor ray R1 (depth of the cursor).

Once the depth of the final cursor ray R1 for the current frame is determined, the cursor position engine 113 then determines the 3D position of the cursor within the current frame of the VR scene 175 based on the direction and depth of the final cursor ray R1. The cursor position engine 113 can then transmit the current 3D position of the cursor to the VR engine 112 which renders the current frame of the VR scene 175. The rendered current frame includes a graphical image/representation of the cursor located at the current 3D position within the VR scene 175. The rendered current frame of the VR scene 175 is then received and displayed on the VR headset 171.

Therefore, for each current frame of the VR scene 175, the cursor position engine 113 determines a 3D position of the cursor within the VR scene 175 based on the user viewpoint and selectable virtual objects within the VR scene 175. In this manner, the disclosed techniques address both the diplopia problem and the perspective problem, which enables continuous and consistent object selection and movement of the cursor within the VR scene 175.

Figure 3:
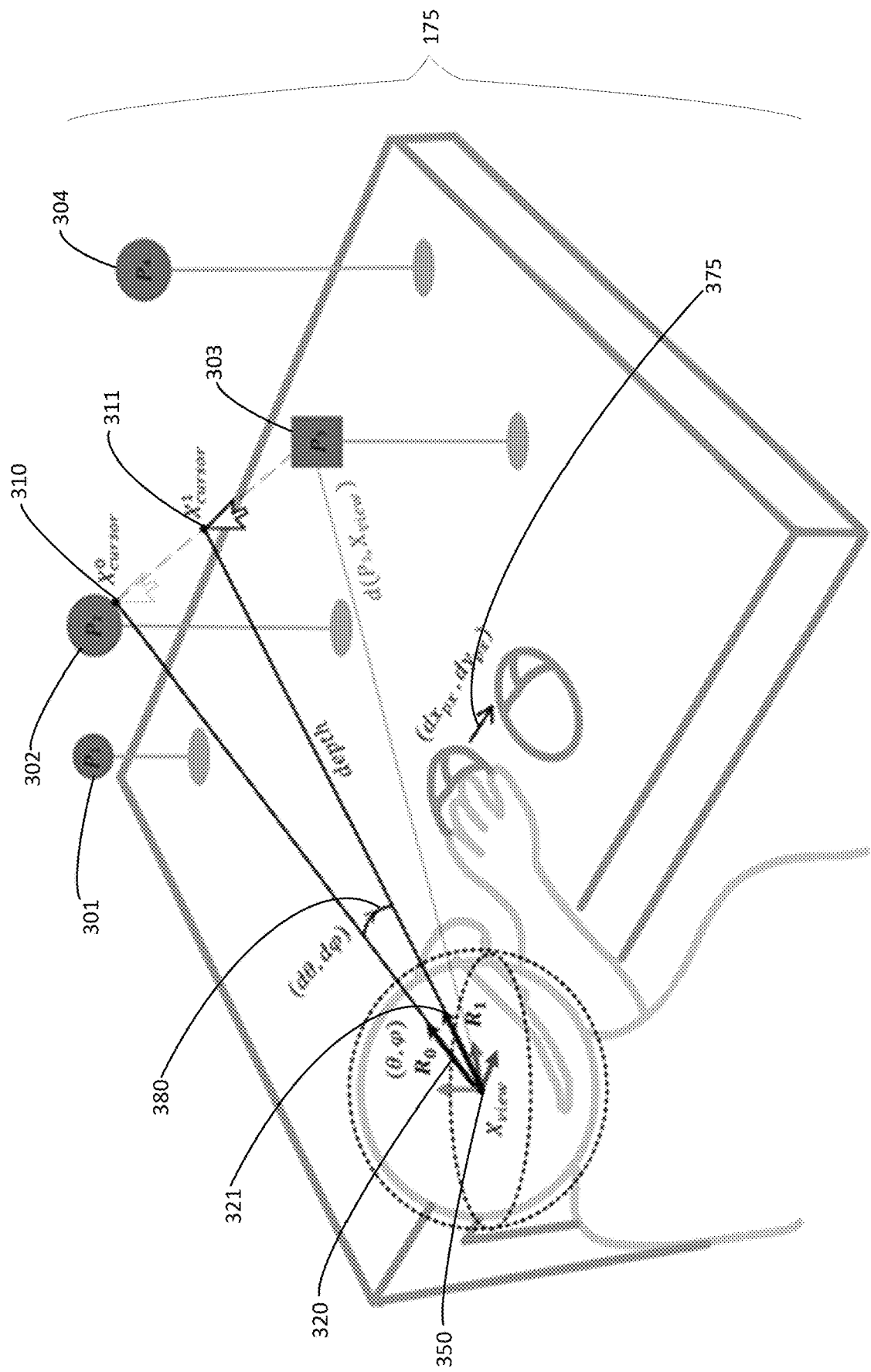
FIG. 3 illustrates a direction of a final cursor ray determined for a current frame of a VR scene, according to various embodiments.

FIG. 3 illustrates a direction of a final cursor ray determined for a current frame of a VR scene 175, according to various embodiments. As shown, the VR scene 175 includes a plurality of selectable virtual objects 301, 302, 303, and 304, a previous cursor position X0cursor 310, a current cursor position X1cursor 311, an initial cursor ray R0 320, a final cursor ray R1 321, and a user viewpoint Xview 350. The selectable virtual objects include a first object P1 301, a second object P2 302, a third object P3 303, and a fourth object P4 304. The previous cursor position X0cursor 310 is the 3D location of the cursor determined for the previous frame just prior to the current frame. The current cursor position X1cursor 311 indicates the 2D location of the cursor determined for the current frame based on a current mouse movement (dxpx, dypx) 375, also referred to as delta movement. However, the depth and 3D location of the current cursor position X1cursor 311 for the current frame is unknown at this stage, and is determined in a later procedure described below in relation to FIGS. 4-5. In general, the various cursor rays are specified in spherical coordinates.

First, the cursor position engine 113 modifies a previous cursor ray RP (not shown) for the previous frame to generate the initial cursor ray R0 320. The previous cursor ray RP originates at a previous user viewpoint (specified in 3D coordinates) and points in the direction of the previous cursor position X0cursor 310 (specified in 3D coordinates). The cursor position engine 113 updates the origin of the previous cursor ray RP based on the current user viewpoint Xview 350 to generate the initial cursor ray R0 320. The current user viewpoint Xview 350 is specified in 3D coordinates (such as x, y, z coordinates) that can be derived from the tracking data received from the VR headset 171. Thus, the initial cursor ray R0 320 originates at the current user viewpoint Xview 350 and points in the direction of the previous cursor position X0cursor 310 of the previous frame of the VR scene 175. The initial cursor ray R0 320 is computed in spherical coordinates as (θ, φ) with respect to the current user viewpoint Xview 350.

The cursor position engine 113 then updates the direction of the initial cursor ray R0 320 based on the current mouse movement (dxpx, dypx) 375 to generate the final cursor ray R1 321 for the current frame. The current mouse movement 375 comprises a physical movement of the 2D input device that is specified as movements in two dimensions, such as an amount of left/right movement in the X direction and an amount of up/down movement in the Y direction. Note that since the 2D input device only operates in two dimensions, the 2D input device and the current mouse movement 375 does not specify a depth movement in the Z direction. The current mouse movement 375 can be specified in pixels, such as (dxpx, dypx) which specifies an amount of delta movement in the X direction in terms of pixels (dxpx) and an amount of delta movement in the Y direction in terms of pixels (dypx). The current mouse movement 375 can also be specified in other units, such as dots. In general, when an input device detects a user input, such as a click or a physical movement, the input device generates an input packet that describes the user input. Therefore, the cursor position engine 113 can receive an input packet from the input device that specifies the current mouse movement (dxpx, dypx) 375.

The current mouse movement (dxpx, dypx) 375 (delta movement) is then converted to an amount of angular movement (dθ, dφ) 380 (delta motion) of the initial cursor ray R0 320. In particular, the delta movement (dxpx, dypx) specified in pixels can be converted to a delta motion (dθ, dφ) specified in spherical coordinates by equation (1) below:

$$\begin{pmatrix} d\theta \\ d\varphi \end{pmatrix} = \frac{CD_{gain}}{Res_{mouse}} \begin{pmatrix} dx_{px} \\ dy_{px} \end{pmatrix} \quad (1)$$

The CD gain value 145 can be a default value or a value computed by the CD gain engine 115. In some embodiments, the CD gain value 145 associated with a 2D input device and VR headset 171 pairing is specified in degrees per inch (dpi), which denotes a ratio of an amount of angular movement (in degrees) of the cursor in the VR scene 175 displayed by the VR headset 171 that results from an amount of physical movement (1 inch) of the 2D input device in the physical space. The resolution of the mouse ($Res_{mouse}$) can be specified in pixels per inch (ppi) or dots per inch. The resolution of the mouse is a specification of the 2D input device that can be received and stored to the memory 104 of the computer system 101 as a component specification 140.

In general, equation (1) describes the conversion from the current mouse movement in pixels to the angular movement of the cursor ray in degrees. In particular, the horizontal movement dxpx is converted into azimuthal angle dθ that is multiplied with the CD gain value 145 and divided by the resolution of the mouse ($Res_{mouse}$). Similarly, the vertical movement dypx is converted into polar angle dφ that is multiplied with the CD gain value 145 and divided by the resolution of the mouse ($Res_{mouse}$).

The delta motion (dθ, dφ) is then added to the initial cursor ray R0 (θ, φ) to generate the final cursor ray R1 321 for the current frame. Thus, the final cursor ray R1 321 is computed in spherical coordinates as (θ+dθ, φ+dφ). The final cursor ray R1 321 originates at the current user viewpoint Xview 350 and points in the direction of the current cursor position X1cursor 311 for the current frame of the VR scene 175.

Once the direction of the final cursor ray R1 321 for the current frame is determined, the cursor position engine 113 then determines the depth of the final cursor ray R1 321. To do so, the cursor position engine 113 casts the final cursor ray R1 into the VR scene 175 to determine if the final cursor ray R1 intersects with any selectable virtual objects within the current VR scene 175. If so, the depth of the final cursor ray R1 is set to equal the depth of the virtual object that the final cursor ray R1 intersects/hits. Note that the depth and 3D coordinates of each of the selectable virtual objects within the current VR scene 175 will be known to the VR engine 112 and the cursor position engine 113. For example, if the final cursor ray R1 intersects/hits a first selectable virtual object, the depth of the final cursor ray R1 is set to equal the depth of the first selectable virtual object.

Figure 4:
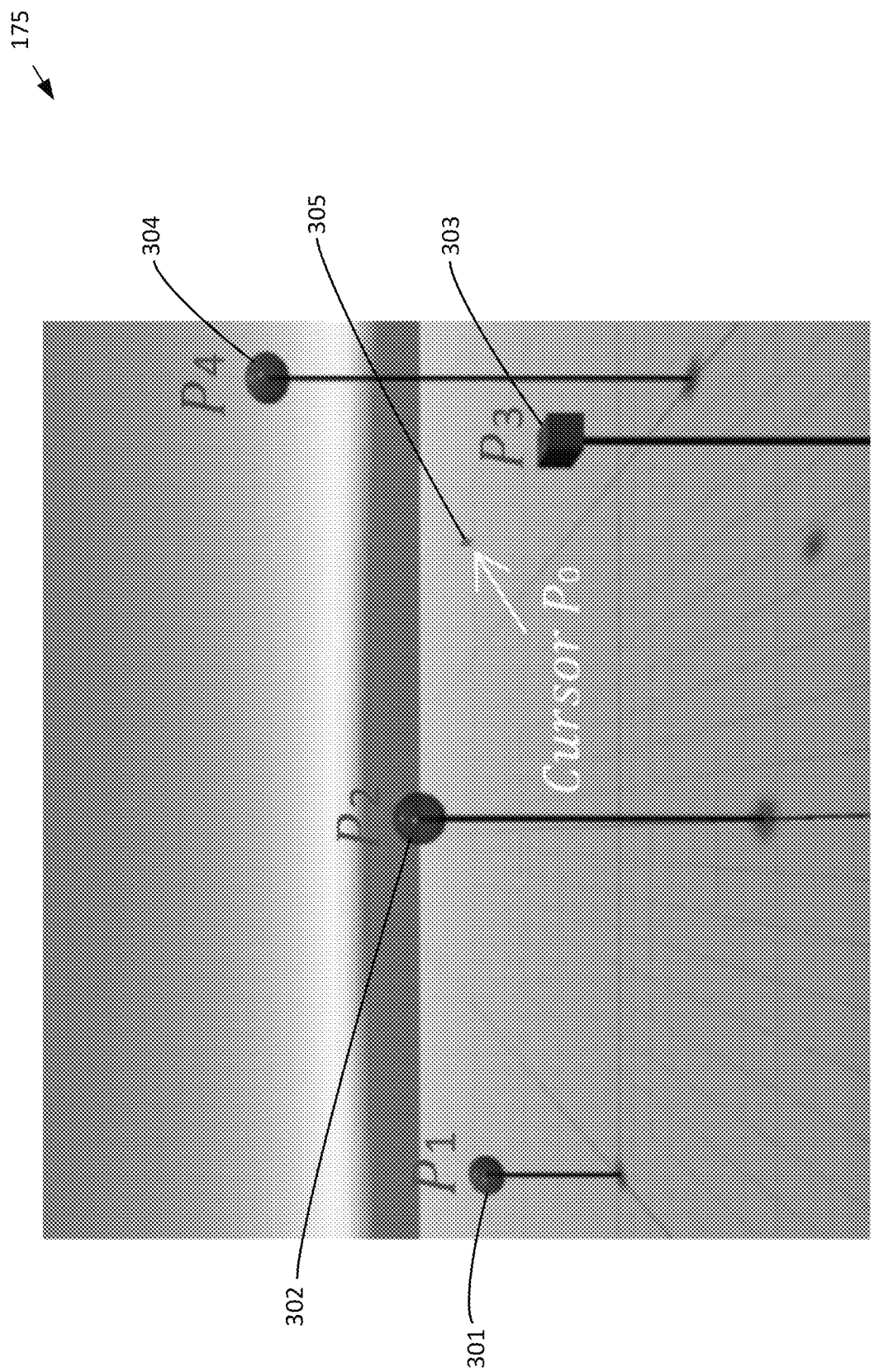
FIG. 4 illustrates different selectable virtual objects within the current VR scene, according to various embodiments.

However, if the final cursor ray R1 does not intersect any selectable virtual objects within the VR scene 175, the cursor position engine 113 performs an interpolation technique based on one or more selectable virtual objects within the current VR scene 175 to determine an interpolated depth of the final cursor ray R1. FIG. 4 illustrates different selectable virtual objects within the current VR scene, according to various embodiments. As shown, the VR scene 175 includes selectable virtual objects comprising the first object P1 301, the second object P2 302, the third object P3 303, and the fourth object P4 304. The cursor 305 is also shown as a cursor object P0 within the VR scene 175.

Figure 5:
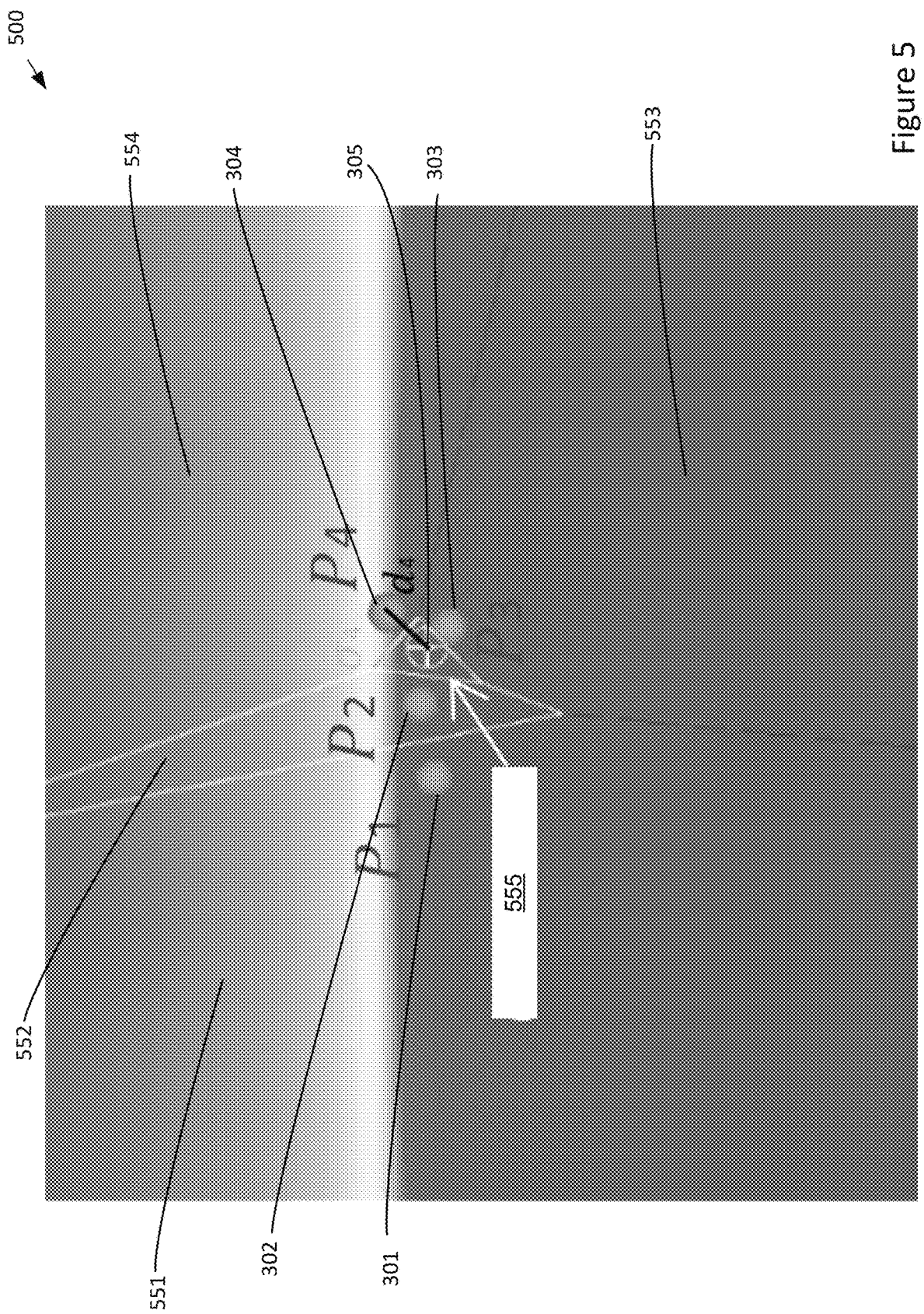
FIG. 5 illustrates different selectable virtual objects and a cursor projected onto a 2D plane, according to various embodiments.

In particular, the interpolation technique projects the selectable objects of the current VR scene 175 and the cursor onto a 2D plane. In some embodiments, the 2D plane is defined as an image plane of the user viewpoint at the center of the two eyes of the user. The selectable objects of the VR scene 175 can be projected onto the 2D plane (x, y plane) based on 2D coordinates (x, y) derived from the 3D coordinates of the selectable objects. The cursor can be projected onto the 2D plane based on the direction of the final cursor ray R1 321 determined for the current frame. In particular, the cursor can be projected onto the 2D plane based on 2D (x, y) coordinates derived from the direction of the final cursor ray R1 321. FIG. 5 illustrates different selectable virtual objects and a cursor projected onto a 2D plane, according to various embodiments. As shown, the selectable virtual objects 301, 302, 303, and 304 and the cursor object 305 are projected onto a 2D plane 500. Note that the cursor object 305 is represented by a circular wire frame shown in FIG. 5. The virtual objects 301, 302, 303, and 304 and the cursor object 305 that are projected onto the 2D plane 500 are referred to as a set of seed points of a Voronoi diagram.

The interpolation technique then generates a Voronoi diagram on the 2D plane 500 based on the set of seed points (objects 301, 302, 303, 304, and 305) to determine a set of selectable virtual objects 301, 302, 303, and 304 that are natural neighbors of the cursor object 305. In particular, the interpolation technique generates the Voronoi diagram by subdividing the 2D plane 500 into a plurality of Voronoi regions/cells, one Voronoi cell being generated for each seed point/object. A Voronoi cell can comprise different types of shapes and any type of polygon. A Voronoi cell is also known as a Thiessen polygon. One Voronoi cell is generated for each seed point. The Voronoi cell generated for a particular seed point is defined such that each other point of the 2D plane 500 within the Voronoi cell is closest to that particular seed point than any other seed point on the 2D plane 500. Thus, for a particular seed point, there is a corresponding Voronoi cell consisting of all points on the 2D plane 500 that is closer to that particular seed point than to any other seed point on the 2D plane 500.

As shown in FIG. 5, the Voronoi diagram includes a first cell 551 generated for the first object P1 301, a second cell 552 generated for the second object P2 302, a third cell 553 generated for the third object P3 303, a fourth cell 554 generated for the fourth object P4 304, and a fifth cell 555 generated for the cursor object P0 305. Note that the fifth cell 555 corresponding to the cursor object P0 305 comprises the small triangle towards the center of the 2D plane 500.

A set of natural neighbors of the cursor object P0 305 is then determined based on the Voronoi diagram. A natural neighbor of a particular seed point comprises another seed point having a corresponding cell that touches (has a shared edge with) the cell corresponding to the particular seed point. Thus, a natural neighbor of the cursor object P0 305 comprises any selectable virtual object having a corresponding cell that touches the fifth cell 555 corresponding to the cursor object P0 305. As shown, the set of natural neighbors of the cursor object P0 305 comprises the second object P2 302, the third object P3 303, and the fourth object P4 304, since each such object 302, 3, and 304 has a corresponding cell 552, 553, and 554, respectively, that touches (has a shared edge with) the fifth cell 555 corresponding to the cursor object P0 305. Only the first object P1 301 is not a natural neighbor of the cursor object P0 305 since the first cell 551 corresponding to the first object P1 301 does not touch the fifth cell 555 corresponding to the cursor object P0 305. Thus, the set of natural neighbors of the cursor comprises a set of selectable objects within the VR scene 175. In some embodiments, the set of natural neighbors of the cursor comprises a subset of all selectable objects within the VR scene 175. In some embodiments, the set of natural neighbors of the cursor comprises two or more selectable objects within the VR scene 175.

The interpolation technique then applies an interpolation algorithm to the set natural neighbors of the cursor to compute the depth of the final cursor ray R1 (cursor depth). In general, the depth of cursor P0 can be computed based on the distances between the user viewpoint Xview 350 and the natural neighbors of the cursor P0. For example, the depth of cursor P0 can be computed based on a first distance between the user viewpoint Xview 350 and the second object P2 302, a second distance between the user viewpoint Xview 350 and the third object P3 303, and a third distance between the user viewpoint Xview 350 and the fourth object P4 304.

The interpolation algorithm comprises the one or more interpolation operations. In some embodiments, the interpolation algorithm comprises the Laplacian interpolation algorithm. In these embodiments, the depth of cursor P0 can be computed based on a weighted sum of the Euclidean distances between the user viewpoint Xview 350 and a natural neighbor Pi for all N natural neighbors of P0—as shown by equation (2) below:

$$\text{depth} = \sum_{i=1}^{N} \lambda_i \cdot d(P_i, X_{view}) \quad (2)$$

For example, the depth of cursor $P_0$ can be computed based on the weighted sum of a first Euclidean distance between the user viewpoint $X_{view}$ 350 and the second object $P_2$ 302, a second Euclidean distance between the user viewpoint $X_{view}$ 350 and the third object $P_3$ 303, and a third Euclidean distance between the user viewpoint $X_{view}$ 350 and the fourth object $P_4$ 304.

The weight $\lambda_i$ of a natural neighbor $P_i$ is computed as a normalized ratio between the length of the shared edge $\sigma_i$ and the Euclidean distance $d_i$ between cursor $P_0$ and the natural neighbor $P_i$—as shown by equations (3) and (4) below:

$$\lambda_i = \frac{\hat{\lambda}_i}{\sum_{j=1}^{N} \hat{\lambda}_j} \quad (3)$$

$$\hat{\lambda}_i = \frac{\sigma_i}{d(P_i, P_0)} \quad (4)$$

The length of the shared edge $\sigma_i$ comprises the length of the edge that is shared between the Voronoi cell corresponding to the cursor $P_0$ and the Voronoi cell corresponding to the natural neighbor $P_i$. For example, for the natural neighbor comprising the fourth object $P_4$, the shared edge $\sigma_4$ and the Euclidean distance $d_4$ between cursor $P_0$ and the fourth object $P_4$ is illustrated in FIG. 5.

Once the depth of the final cursor ray $R_1$ (cursor depth) for the current frame is determined, the cursor position engine 113 then determines the 3D position of the cursor within the current frame of the VR scene 175 based on the direction and depth of the final cursor ray $R_1$. Cursor depth indicates the distance from the user viewpoint $X_{view}$ to the current cursor position $X_{cursor}^1$ along the final cursor ray R1. Cursor depth can be specified in pixels. The cursor position engine 113 can convert the direction and depth of the final cursor ray $R_1$ (as specified in spherical coordinates) to 3D coordinates (as specified in x, y, z coordinates) that specify the current cursor position $X_{cursor}^1$ 311 within the VR scene 175. For example, the current cursor position $X_{cursor}^1$ 311 can be computed based on the user viewpoint $X_{view}$ 350, the final cursor ray R1, and the cursor depth—as shown in equation (5) below:

$$X_{cursor}^1 = X_{view} + R_1 \cdot \text{depth} \quad (5)$$

The cursor position engine 113 then transmits the current 3D position of the cursor to the VR engine 112, which renders the current frame of the VR scene 175. The rendered current frame includes a graphical image/representation of the cursor located at the current 3D position within the VR scene 175. The rendered current frame of the VR scene 175 is then received and displayed on the VR headset 171. The cursor position engine 113 can perform the above operations for each frame of the VR scene 175 to determine a current 3D position of the cursor for each frame of the VR scene 175.

Figure 6A:
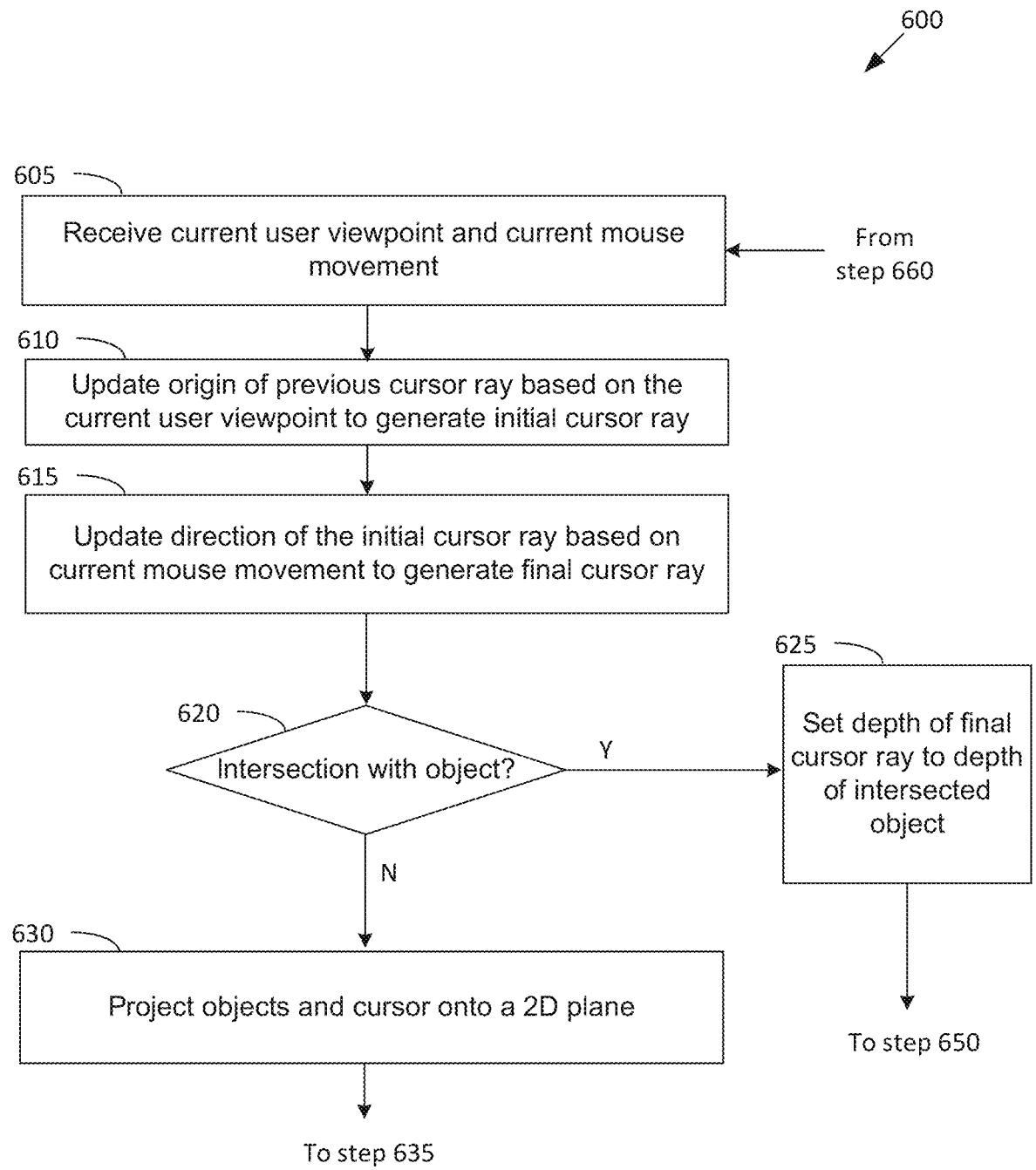
FIGS. 6A-6B set forth a flow diagram of method steps for displaying a cursor controlled by a 2D input device within a 3D environment, according to various embodiments.
Figure 6B:
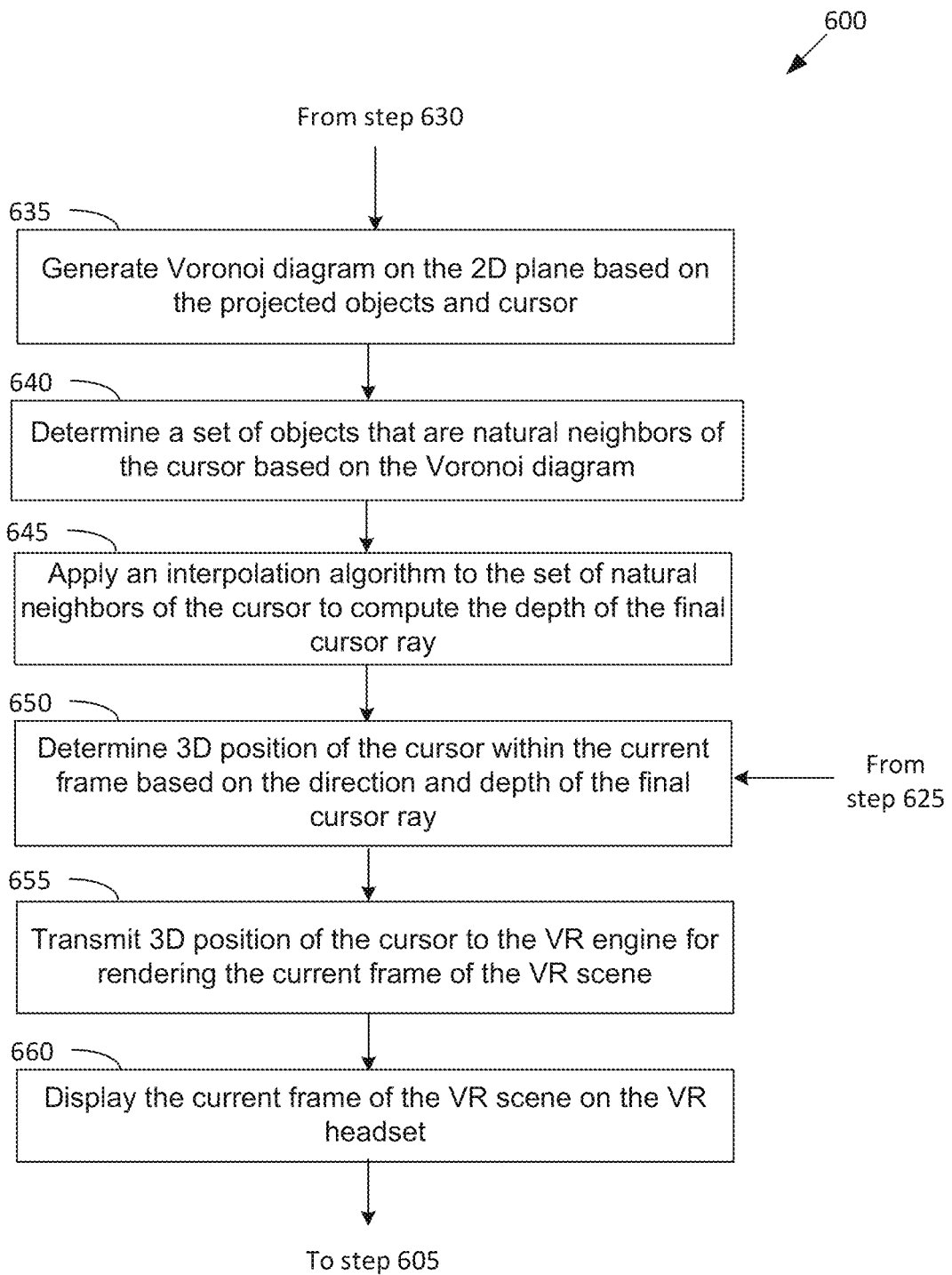

FIGS. 6A-6B set forth a flow diagram of method steps for displaying a cursor controlled by a 2D input device within a 3D environment, according to various embodiments. Although the method steps are described in conjunction with the systems of FIGS. 1-5, persons skilled in the art will understand that the method steps can be performed in any order by any system. In some embodiments, the method 600 can be performed by the workstation 100.

The method 600 begins when a new current user viewpoint Xview 350 and a new current mouse movement (dxpx, dypx) 375 are received (at step 605) for a current frame of a VR scene 175 by the cursor position engine 113. The current user viewpoint Xview 350 can be specified in 3D coordinates that indicate the 3D position of the current user viewpoint within the VR scene 175. The current user viewpoint Xview 350 can be received from the tracking devices 173 that track the VR headset 171 worn by the user. The current mouse movement (dxpx, dypx) 375 indicates x, y movements of the 2D input device. The current mouse movement (dxpx, dypx) 375 can be received from the 2D mouse 152 via an input packet.

The cursor position engine 113 then updates (at step 610) the origin of a previous cursor ray RP for the previous frame to generate an initial cursor ray R0 320. The previous cursor ray RP originates at a previous user viewpoint and points in the direction of the previous cursor position X0cursor 310. The cursor position engine 113 replaces the origin of the previous cursor ray RP with the current user viewpoint Xview 350 to generate the initial cursor ray R0 320. Thus, the initial cursor ray R0 320 originates at the current user viewpoint Xview 350 and points in the direction of the previous cursor position X0cursor 310 of the previous frame of the VR scene 175. The initial cursor ray R0 320 is specified in spherical coordinates as (θ, φ) with respect to the current user viewpoint Xview 350.

The cursor position engine 113 then updates (at step 615) the direction of the initial cursor ray R0 320 based on the current mouse movement (dxpx, dypx) 375 to generate the final cursor ray R1 321 for the current frame. The current mouse movement 375 (delta movement) can be specified in pixels, such as (dxpx, dypx). The current mouse movement (dxpx, dypx) 375 can be converted to an amount of angular movement (dθ, dφ) 380 of the initial cursor ray R0 320 based on the CD gain value 145 and the resolution of the mouse ($Res_{mouse}$), as shown in equation (1). The delta motion (dθ, dφ) is then added to the initial cursor ray R0 (θ, φ) to generate the final cursor ray R1 321 for the current frame. Thus, the final cursor ray R1 321 is computed in spherical coordinates as (θ+dθ, φ+dφ). The final cursor ray R1 321 originates at the current user viewpoint Xview 350 and points in the direction of the current cursor position X1cursor 311 for the current frame of the VR scene 175.

The cursor position engine 113 then casts the final cursor ray R1 321 into the VR scene 175 to determine (at step 620) if the final cursor ray R1 intersects with any selectable virtual object within the current VR scene 175. If it is determined that the final cursor ray R1 intersects with a selectable virtual object (at step 620—Yes), the cursor position engine 113 sets (at step 625) the depth of the final cursor ray R1 to equal the depth of the virtual object that the final cursor ray R1 intersects/hits. The method 600 then continues at step 650.

If it is determined that the final cursor ray R1 does not intersect with any selectable virtual object within the VR scene 175 (at step 620—No), the method 600 continues at step 630. At steps 630-645, the cursor position engine 113 performs an interpolation technique to interpolate the depth of the final cursor ray R1 based on the selectable virtual objects within the current VR scene 175. At step 630, the cursor position engine 113 projects the selectable objects of the current VR scene 175 and the cursor onto a 2D plane 500. The selectable objects of the VR scene 175 can be projected onto the 2D plane (x, y plane) based on 2D coordinates (x, y) derived from the 3D coordinates of the selectable objects. The cursor can be projected onto the 2D plane based on 2D (x, y) coordinates derived from the final cursor ray R1 321 determined for the current frame.

The selectable objects and the cursor projected onto the 2D plane 500, comprise a set of seed points for a Voronoi diagram. The cursor position engine 113 then generates (at step 635) a Voronoi diagram on the 2D plane 500 based on the set of seed points (the selectable objects and the cursor). The Voronoi diagram is generated by subdividing the 2D plane 500 into a plurality of Voronoi cells, one Voronoi cell being generated for each seed point. The cursor position engine 113 then determines (at step 640) a set of natural neighbors of the cursor based on the Voronoi diagram. A natural neighbor of the cursor comprises a selectable virtual object having a corresponding Voronoi cell that touches the Voronoi cell corresponding to the cursor. The set of natural neighbors of the cursor comprises a set of selectable objects.

The cursor position engine 113 then applies (at step 645) an interpolation algorithm to the set of selectable objects comprising the set of natural neighbors of the cursor to compute the depth of the final cursor ray R1 (cursor depth). In some embodiments, the interpolation algorithm comprises the Laplacian interpolation algorithm. The cursor position engine 113 then determines (at step 650) the 3D position of the cursor within the current frame of the VR scene 175 based on the direction and depth of the final cursor ray R1.

The cursor position engine 113 then transmits (at step 655) the 3D position of the cursor to the VR engine 112, which renders the current frame of the VR scene 175. The rendered current frame includes a graphical image/representation of the cursor located at the 3D position within the VR scene 175. The rendered current frame of the VR scene 175 is then displayed (at step 660) on the VR headset 171. The method 600 then continues at step 605 to process a next current frame of the VR scene 175.

Computing the Control Display Gain

A CD gain value defines a ratio between an amount of movement of a cursor within a 3D environment and an amount of physical movement of a 2D input device that controls the cursor. Thus, the CD gain value indicates a ratio of a particular amount of movement of the cursor within the 3D environment that results from (is caused by) a particular amount of physical movement of the 2D input device that controls the cursor. In some embodiments, the CD gain value is specified in degrees per inch (dpi), which denotes a ratio between an amount of angular movement (in degrees) of the cursor in the VR scene 175 and an amount of physical movement (1 inch) of the 2D input device in the physical space. A CD gain that is set too low can result in over-clutching of the 2D input device, whereas a CD gain that is set too high can result in a lack of precision of the 2D input device. Conventional approaches do not provide a CD gain that is optimized for a 2D input device utilized in a 3D environment, which results in either over-clutching or lack of precision of the 2D input device.

In some embodiments, the CD gain engine 115 is implemented to compute a control-display (CD) gain that is optimized for a 2D input device operating with a 3D interface (such as a VR interface or AR interface). In particular, the CD gain engine 115 is implemented to compute a CD gain optimized for a 2D input device utilized in a 3D environment that is displayed by a 3D display (such as an VR headset or AR headset). The CD gain engine 115 can determine the CD gain based, at least in part, on specifications for the 2D input device and the 3D display. In these embodiments, the CD gain is determined based, at least in part, on limitations and capabilities of the 2D input device and the 3D display. The CD gain can also be determined based, at least in part, on limitations of human vision and human motor system. In this manner, the disclosed techniques provide a CD gain which reduces over-clutching of the 2D input device while maintaining a satisfactory level of precision of the 2D input device, which enables efficient and accurate object selection and movement of the cursor within the 3D environment.

In some embodiments, the CD gain engine 115 computes the CD gain by performing a viewing algorithm that determines a minimum display size of an object displayed in the 3D environment to be discernible (for an object comprising a graphic) or legible (for an object comprising a text character) to the human eye. The minimum display size of the object is referred to as the minimum object size. The viewing algorithm can determine the minimum object size based on specifications of the 3D display. In some embodiments, the minimum object size is specified as a minimum angular size of an object.

The CD gain engine 115 then performs a gain algorithm that determines a range of CD gain values based on the minimum object size and specifications for the 2D input device and the 3D display. The range of CD gain values includes a minimum CD gain value and a maximum CD gain value. A CD gain value between the range of CD gain values is then selected. For example, a CD gain value that is approximate to the middle of the range of CD gain values can be selected, or a user can select the CD gain value.

The CD gain engine 115 then transmits the CD gain value to the cursor position engine 113 for performing the disclosed techniques of the cursor position engine 113. In other embodiments, the CD gain value can be used in any 3D-based interface to map 2D device movements to corresponding cursor movements within a 3D environment displayed on a 3D display. In general, the techniques disclosed in relation to the cursor position engine 113 in Section II and the techniques disclosed in relation to the CD gain engine 115 in Section III can be performed separately and independently, or can be performed in conjunction.

To optimize the CD gain value for a 2D input device operating with a 3D display, the CD gain engine 115 first receives specifications for the 2D input device and the 3D display. In some embodiments, the 2D input device comprises a 2D mouse. In other embodiments, the 2D input device comprises another type of input device, such as a trackball. In some embodiments, the 3D display comprises a VR headset 171. However, in other embodiments, the 3D display can comprise any other type of 3D display, such as an AR headset. The various specifications can be stored to and retrieved from the memory unit 104 of the computer system 101 as component specifications 140. The specifications for the 2D input device include the resolution of the mouse ($Res_{mouse}$), which can be specified in pixels per inch (ppi) or dots per inch. The specifications for the 3D display include field of view, screen resolution, display resolution, a minimal graphic value, and a minimal character value.

The field of view of a 3D display specifies the largest viewing angle provided by the 3D display, such as 100 degrees, 120 degrees, or 180 degrees. The screen resolution specifies the pixel width and the pixel height provided by the 3D display, such as 1920×1080, 2880×1440, or 3840×2160. The display resolution ($Res_{hmd}$) can be derived from the specifications for the screen resolution and field of view. The display resolution ($Res_{hmd}$) specifies a ratio between the pixel width of the screen resolution and the field of view. The display resolution ($Res_{hmd}$) can be specified in pixels per degree (ppd), such as 22.22 pixels per degree. The display resolution ($Res_{hmd}$) is also referred to as pixel density of the display. The minimal graphic value specifies the minimal number of pixels required by the 3D display to display a graphic object to be discernible to the human eye, such as 1 pixel. The minimal character value specifies the minimal number of pixels required by the 3D display to display a text character object to be legible to the human eye, such as 8 pixels.

The CD gain engine 115 then performs a viewing algorithm that determines a usable range of positions to safely display an object with the minimum size to be discernible (for graphics) or legible (for text characters) in the 3D environment to the human eye. In some embodiments, the CD gain engine 115 performs a viewing algorithm that determines a minimum object size displayed in the 3D environment to be visible/discernible (for graphics) or legible (for text characters) to the human eye. The minimum object size can be specified as a minimum angular size of an object, rather than a pixel size or physical size of the object. Human vision has limited acuity to discern small details with precision. For example, the minimum visual angle for a visual stimulus to be distinguishable with human eyes in normal 20/20 vision is $1/60$ degrees (0.02 degrees) for a graphic to be visible/discernible and $1/12$ degrees (0.08 degrees) for a text character to be legible.

The viewing algorithm can determine a minimum angular size (minimum object size) of an object displayed in the 3D environment based on the specifications of the 3D display. For example, assume that the minimal graphic value for the 3D display is 1 pixel, the minimal character value for the 3D display is 8 pixels, and the display resolution ($Res_{hmd}$) of the 3D display is 22.22 pixels per degree (ppd). For an object comprising a graphic, the minimum angular size of the object can be determined by dividing the minimal graphic value by the display resolution ($Res_{hmd}$). In the above example, for an object comprising a graphic, the minimum angular size of the object is 0.04 degrees, which is calculated by dividing 1 pixel by 22.22 pixels per degree (ppd). For an object comprising a text character, the minimum angular size of the object can be determined by dividing the minimal character value by the display resolution ($Res_{hmd}$). In the above example, for an object comprising a character, the minimum angular size of the object is 0.36 degrees, which is calculated by dividing 8 pixels by 22.22 pixels per degree (ppd). Since an object displayed in the 3D environment can comprise either a graphic or a character, the minimum angular size of the character object (such as 0.36 degrees) is chosen as the minimum angular size for a selectable object within the 3D environment. In other embodiments, however, the minimum angular size of the graphic object (such as 0.04 degrees) is chosen as the minimum angular size for a selectable object within the 3D environment.

When a displayed object needs to be legible, the displayed object needs to comply with the legible requirement (0.36 for example). When the displayed object is not a character, it needs to be distinguishable (0.04 for example). In both cases, the minimum angular size chosen based on specifications of the 3D display should never go beyond the capabilities of human vision. Thus, the minimum angular size is determined within the capability of human eyes in normal 20/20 vision which is $1/60$ degrees (0.02 degrees) for a graphic to be visible/discernible and $1/12$ degrees (0.08 degrees) for a text character to be legible.

Figure 7:
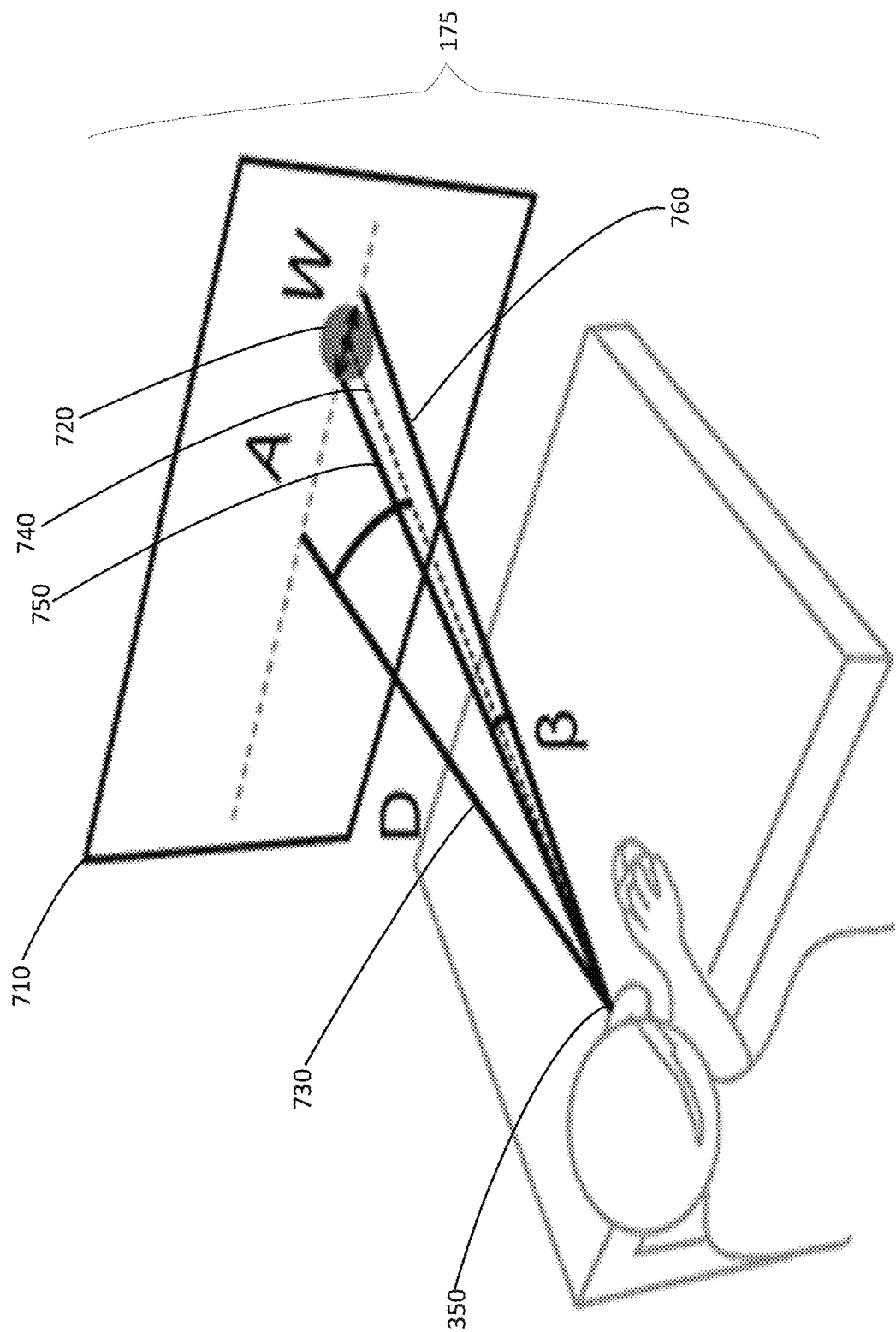
FIG. 7 illustrates the relationship between the width of an object displayed within a 3D environment and the angular size of the object, according to various embodiments.

FIG. 7 illustrates the relationship between the width of an object displayed within a 3D environment and the angular size of the object, according to various embodiments. As shown, a VR scene 175 includes a user viewpoint 350 and an object 720 displayed on a 2D surface 710.

A viewing distance D comprises a distance along a first user sightline 730 from the user viewpoint 350 to the 2D surface 710 when the user is looking straight ahead at the same vertical (y) coordinate of the object 720. The object 720 has a width W that is specified in the same units as the viewing distance D. For example, the viewing distance D and width W can both be specified in pixels, or can both be specified in inches. The angular distance A specifies the size of an angle that the user sees between the first user sightline 730 and a second user sightline 740. The second user sightline 740 comprises a sightline from the user viewpoint 350 to the center of the object 720.

The angular size β specifies the size of an angle that the user sees between a third user sightline 750 and a fourth user sightline 760. The third user sightline 750 comprises a sightline from the user viewpoint 350 to the left-most edge of the object 720. The fourth user sightline 760 comprises a sightline from the user viewpoint 350 to the right-most edge of the object 720. Thus, the angular size β specifies the angular size (visual angle) of the object 720.

The relationships between the viewing distance D, object width W, angular distance A, and angular size β are shown by equation (6) below:

$$\tan\left(A + \frac{\beta}{2}\right) - \tan\left(A - \frac{\beta}{2}\right) = \frac{W}{D} \quad (6)$$

The minimum angular size is entered into equation (6) as a threshold for beta (angular size β). Then using equation (6), the system determines where an object can be safely displayed with an object width W by enumerating different possible values of angular distance A and viewing distance D to determine if the result of beta becomes smaller than the determined value of the minimum angular size. If so, this indicates that the system cannot render an object smaller than object width W in that region.

The minimum angular size for a selectable object is then passed from the viewing algorithm to the gain algorithm. The gain algorithm then determines an optimized range of CD gain values based on the minimum angular size (minimum object size) and specifications for the 2D input device and the 3D display. The range of CD gain values includes a minimum CD gain value (lower bound) and a maximum CD gain value (upper bound).

The gain algorithm calculates the minimum CD gain value ($CD_{min}$) as a ratio between the field of view ($A_{max}$) of the 3D display and the physical operating range (OR) of the 2D input device—as shown by equation (7) below:

$$CD_{min} = \frac{A_{max}}{OR} \quad (7)$$

The field of view ($A_{max}$) specifies the largest viewing angle provided by the 3D display, such as 180 degrees. Thus, the field of view ($A_{max}$) specifies the maximal travel distance (in degrees) of a cursor to select a target object in the VR scene 175. The physical operating range (OR) of the 2D input device is based on the physical size of the deskspace where a user is using the 2D input device. For example, the physical operating range (OR) can comprise the physical distance from a left-most edge to a right-most edge of the deskspace where the user is using the 2D input device. Thus, the operating range (OR) specifies the maximal input movement in the physical space. The operating range (OR) typically ranges from 10 cm (3.937 inches) to 30 cm (11.811 inches). The examples discussed herein use an operating range (OR) of 30 cm (11.811 inches). In other embodiments, other values for the operating range (OR) can be used. For a field of view ($A_{max}$) of 180 degrees and an operating range (OR) of 30 cm (11.811 inches), the $CD_{min}$ is calculated as 15.24 degrees per inch (dpi).

The gain algorithm calculates the maximum CD gain value ($CD_{max}$) based on two different CD gain values. The first CD gain value comprises a device-precision CD gain ($CD_{qmax}$) and the second CD gain value comprises a hand-precision CD gain ($CD_{lmax}$). The gain algorithm selects the lower (minimal) of the device-precision CD gain ($CD_{qmax}$) and the hand-precision CD gain ($CD_{lmax}$) as the maximum CD gain value ($CD_{max}$)—as shown below in equation (8):

$$CD_{max} = \min\left(\frac{W_{min}}{\frac{Res_{hand}}{CD_{lmax}}}, \frac{Res_{device}}{\frac{Res_{hmd}}{CD_{qmax}}}\right) \quad (8)$$

The device-precision CD gain ($CD_{qmax}$) considers the level of precision of the 2D input device. In particular, the device-precision CD gain ($CD_{qmax}$) considers the minimal input movement that can be sensed by the 2D input device to move the cursor in the 3D environment by one pixel. As shown in equation (8), the device-precision CD gain ($CD_{qmax}$) comprises a ratio between the mouse resolution ($Res_{mouse}$) and the display resolution ($Res_{hmd}$). The mouse resolution ($Res_{mouse}$) indicates the minimal input movement that can be sensed by the 2D input device to move the cursor in the 3D environment by one pixel. The mouse resolution ($Res_{mouse}$) can be specified in pixels per inch (ppi), such as 1000 ppi. The display resolution ($Res_{hmd}$) of the 3D display can be specified in pixels per degree (ppd), such as 22.22 ppd. For example, for a mouse resolution ($Res_{mouse}$) of 1000 ppi and a display resolution ($Res_{hmd}$) of 22.22 pixels per degree, the device-precision CD gain ($CD_{qmax}$) is computed as 1000 ppi divided by 22.22 ppd, which equals 45 degrees per inch (dpi).

The hand-precision CD gain (CDlmax) considers the level of precision of the human hand in providing physical input movements to the 2D input device. In particular, the hand-precision CD gain (CDlmax) considers the minimal physical input movement that can be performed by human hands (such as human hands with tremors). As shown in equation (8), the hand-precision CD gain (CDlmax) comprises a ratio between the minimum angular size of an object (Wmin) and the minimal hand input (Reshand). The minimum angular size of an object (Wmin) for the 3D display is calculated by the viewing algorithm and is specified in degrees, such as 0.36 degrees. The minimal hand input (Reshand) is the minimal physical input movement that can be performed by human hands (as determined by various studies) and is specified by a physical distance, such as 0.2 mm (0.007874 inches). For example, for a minimum angular size (Wmin) of 0.36 degrees and a minimal hand input (Reshand) of 0.2 mm (0.007874 inches), the hand-precision CD gain (CDlmax) is computed as 0.36 degrees divided by 0.007874 inches, which equals 45.72 degrees per inch (dpi).

The gain algorithm then selects the lower (minimal) of the device-precision CD gain (CDqmax) and the hand-precision CD gain (CDlmax) as the maximum CD gain value (CDmax). For example, the gain algorithm can select the device-precision CD gain (CDqmax) computed as 45 degrees per inch (dpi) and not the hand-precision CD gain (CDlmax) computed as 45.72 degrees per inch (dpi) as the maximum CD gain value (CDmax).

The gain algorithm sets the CD gain range as between the minimum CD gain value (CDmin) and the maximum CD gain value (CDmax), such as between 15.24 and 45 degrees per inch (dpi). In general, setting the CD gain value lower than the minimum CD gain value (CDmin) will result in over-clutching and setting the CD gain value higher than the maximum CD gain value (CDmax) will result in lower precision and some pixels in the 3D environment can become unreachable as caused by either insufficient input device precision or human precision.

The gain algorithm then selects a CD gain value within the CD gain range. In general, a CD gain value selected closer to the minimum CD gain value will increase the precision of the 2D input device, while increasing over-clutching. In contrast, a CD gain value selected closer to the maximum CD gain value will decrease over-clutching, while decreasing the precision of the 2D input device. In some embodiments, the CD gain range is displayed to the user and the user selects a CD gain value within the CD gain range.

In other embodiments, the gain algorithm selects a CD gain value that is approximately in the middle of the CD gain range. In these embodiments, the gain algorithm determines the CD gain value by determining a delta gain (difference value) d between the maximum CD gain value and the minimum CD gain value, multiplying the delta gain d by a predetermined proportional value p (between 0 and 1) to generate an intermediate value i, and adding the intermediate value i, to the minimum CD gain value to determine the selected CD gain value. For example, assume the CD gain range is from a minimum CD gain value of 10 dpi to a maximum CD gain value of 30 dpi, and the predetermined proportional value p equals 0.5 (for selecting a CD gain value that is in the middle of the CD gain range). The delta gain d between 30 dpi and 10 dpi equals 20 dpi. Multiplying the delta gain d of 20 dpi by the proportional value p of 0.5 equals 10 dpi (intermediate value i). The intermediate value i of 10 dpi is then added to the minimum CD gain value of 10 dpi to equal 20 dpi, which is selected as the CD gain value.

In some embodiments, the proportional value p comprises a predetermined default value, such 0.4, 0.5, or 0.6. In further embodiments, the proportional value p is determined based on user input. For example, the gain algorithm can receive a user selection of the proportional value p between 0 and 1. As another example, the gain algorithm can select the proportional value p based on user input that indicates a preference for how the input device behaves, such as a preference for increasing input device precision or a preference for reducing over-clutching. For example, the gain algorithm can select a lower proportional value p, such as between 0 and 0.5, based on user input that indicates a preference for increased input device precision. The gain algorithm can select a higher proportional value p, such as between 0.5 and 1.0, based on user input that indicates a preference for reducing over-clutching.

The CD gain engine 115 then stores the computed CD gain value 145 to the memory 104. The CD gain value 145 can then be used by the cursor position engine 113 to determine a 3D cursor position, as discussed in Section II. In other embodiments, the CD gain value can be used in any 3D-based interface to map 2D input device movements to corresponding cursor movements within a 3D environment displayed on a 3D display (such as a VR or AR headset). In these embodiments, the CD gain value 145 can be used by any VR or AR interface that determines, renders, and displays a 3D location of a cursor (controlled by a 2D input device) within a VR or AR scene. For example, the CD gain value 145 can be used by a VR engine to determine the 3D position of a cursor within a current frame of a VR scene based on a current mouse movement. The VR engine can then render the current frame which includes a graphical image of the cursor located at the determined 3D position within the VR scene. The rendered current frame of the VR scene is then displayed on a VR headset.

Figure 8:
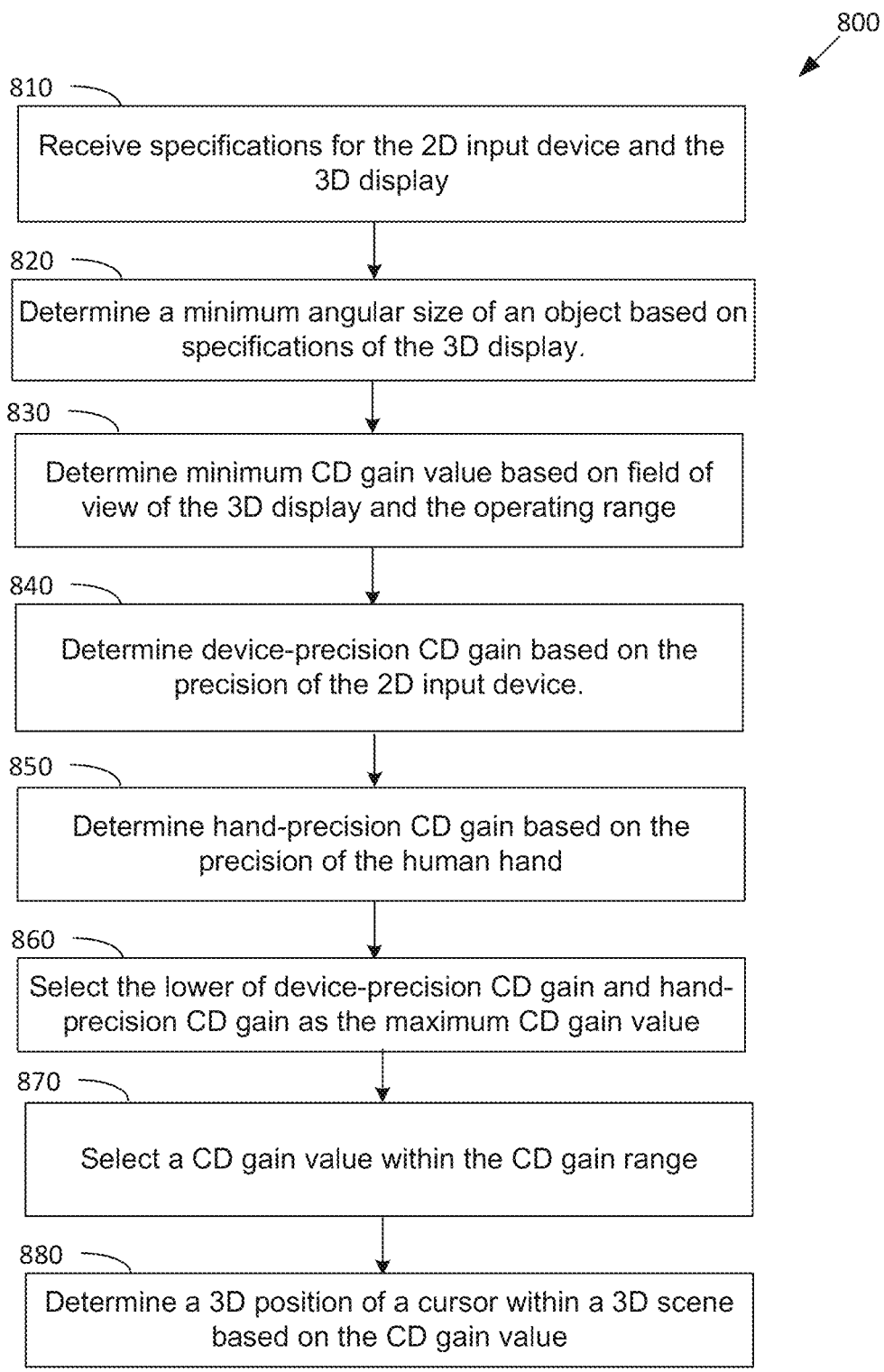
FIG. 8 sets forth a flow diagram of method steps for computing a CD gain for a 2D input device operating with a 3D display, according to various embodiments.

FIG. 8 sets forth a flow diagram of method steps for computing a CD gain for a 2D input device operating with a 3D display, according to various embodiments. Although the method steps are described in conjunction with the systems of FIGS. 1-5 and 7, persons skilled in the art will understand that the method steps can be performed in any order by any system. In some embodiments, the method 800 can be performed by the workstation 100.

The method 800 begins when the CD gain engine 115 receives (at 810) specifications for the 2D input device and the 3D display (such as a VR or AR headset). The various specifications can be stored to and retrieved from the memory unit 104 of the computer system 101 as component specifications 140. The specifications for the 2D input device can include the resolution of the mouse (Resmouse). The specifications for the 3D display can include the field of view, screen resolution, display resolution, a minimal graphic value, and a minimal character value.

The CD gain engine 115 then performs (at step 820) a viewing algorithm to determine a minimum angular size (minimum object size) of an object displayed in the 3D environment based on the specifications of the 3D display. In steps 830-860, the CD gain engine 115 then performs a gain algorithm to determine an optimized range of CD gain values based on the minimum angular size of the object and specifications of the 2D input device and the 3D display. The range of CD gain values ranges from a minimum CD gain value to a maximum CD gain value. The CD gain engine 115 determines (at step 830) the minimum CD gain value as a ratio between the field of view of the 3D display and the operating range (OR) of the deskspace, as shown by equation (7).

The CD gain engine 115 determines (at step 840) the device-precision CD gain (CDqmax) which considers the level of precision of the 2D input device. The device-precision CD gain (CDqmax) comprises a ratio between the mouse resolution (Resmouse) and the display resolution (Reshmd). The CD gain engine 115 determines (at step 850) the hand-precision CD gain (CDlmax) that considers the level of precision of the human hand in providing physical input movements to the 2D input device. The hand-precision CD gain (CDlmax) comprises a ratio between the minimum angular size of an object (Wmin) and the minimal hand input (Reshand). The minimum angular size of an object (Wmin) for the 3D display is calculated by the viewing algorithm. The CD gain engine 115 then selects (at step 860) the lower (minimal) of the device-precision CD gain (CDqmax) and the hand-precision CD gain (CDlmax) as the maximum CD gain value.

The CD gain range comprises the range between the minimum CD gain value (CDmin) and the maximum CD gain value (CDmax). The CD gain engine 115 then selects (at step 870) a CD gain value within the CD gain range. In some embodiments, the CD gain range is displayed to the user and the user selects a CD gain value within the CD gain range. In other embodiments, the CD gain engine 115 selects a CD gain value that is approximately in the middle of the CD gain range. In other embodiments, the CD gain engine 115 determines based on a predetermined proportional value p (between 0 and 1).

A 3D interface then determines (at step 880) a 3D position of a cursor within a current frame of a 3D scene based on a current mouse movement and the CD gain value. For example, the cursor position engine 113 can implement the CD gain value to continually determine the 3D position of a cursor within a 3D scene based on movements of the 2D input device. As another example, any type of 3D interface can implement the CD gain value to determine the 3D position of a cursor within a current frame of the 3D scene based on movements of the 2D input device. The 3D interface can then render and display the current frame of the 3D scene which includes a graphical image of the cursor located at the determined 3D position. The method 800 then ends.

Augmented Reality Interface

In some embodiments described herein, the 3D interface comprises a VR interface comprising VR-specific hardware and software components. VR hardware can include a VR headset 171, one or more VR controllers 172, and one or more tracking devices 173. VR software can include a VR application/engine 112 that renders a VR scene 175 of a 3D virtual environment that is displayed on the VR headset 171.

In an alternative embodiment, the 3D interface comprises an AR interface comprising AR-specific hardware and software components. AR hardware can include an AR headset and one or more AR controllers. The AR headset can comprise an AR (3D) display and one or more cameras for providing a live camera stream/feed that is displayed on the AR display. AR software can include an AR application/engine that generates an AR scene of a 3D augmented environment that is displayed on the AR headset. The AR scene displays the live camera stream/feed, and thus displays a real-world physical environment comprising one or more selectable real-world objects.

The AR engine can also render one or more selectable 3D virtual objects that are displayed within the AR scene at particular locations. The one or more 3D selectable virtual objects are "overlaid" onto the real-world environment of the AR scene. To render and display the virtual objects, the AR engine first performs computer vision algorithms to process the live camera feed of the real-world environment. In particular, the computer vision algorithms determine a 3D map of the real-world environment and 3D positions of real objects within the real-world environment based on the live camera feed. The AR engine can then generate and render one or more virtual objects at particular positions within the AR scene based on the 3D map of the real-world environment and the 3D positions of the real objects. The above operations can be performed by the AR engine for each frame of the AR scene.

For example, FIG. 2 can also illustrate an AR scene comprising a real-world workstation environment. The AR scene can include real/physical objects, such as desk 250, 2D mouse 152, monitor 251, and pen holder 253. The AR scene can also include virtual objects, such as the virtual box 252. The AR scene can be displayed on an AR headset worn by the user 275. The 2D mouse 152 can be used to control the cursor 299 within the AR scene to select real objects and/or virtual objects within the AR scene. For example, the 2D mouse 152 can be used to move the cursor 299 from the real/physical monitor 251 to the virtual box 252, as shown in FIG. 2.

Thus, in the alternative embodiment, a current frame of an AR scene can comprise one or more real objects and one or more virtual objects. Since the 3D position of each real object is known, the techniques disclosed herein can also be applied to an AR scene by processing the real object the same as a virtual object. For example, to determine the 3D position of a cursor controlled by a 2D input device within an AR scene, the cursor position engine 113 can cast the final cursor ray R1 into the AR scene to determine if the final cursor ray R1 intersects with any selectable real or virtual objects within the current AR scene. If it is determined that the final cursor ray R1 intersects with a selectable real or virtual object, the cursor position engine 113 sets the depth of the final cursor ray R1 to equal the depth of the real or virtual object that the final cursor ray R1 intersects/hits.

If no intersection is found, the cursor position engine 113 performs an interpolation technique to interpolate the depth of the final cursor ray R1 based on one or more selectable real or virtual objects within the current AR scene. For example, the cursor position engine 113 projects the real and virtual objects of the current AR scene and the cursor onto a 2D plane. The cursor position engine 113 then generates a Voronoi diagram on the 2D plane based on the real and virtual objects and the cursor. The cursor position engine 113 then determines a set of natural neighbors of the cursor based on the Voronoi diagram. A natural neighbor of the cursor comprises any real or virtual object having a corresponding Voronoi cell that touches the Voronoi cell corresponding to the cursor. The cursor position engine 113 then applies an interpolation algorithm to the set of real or virtual objects comprising the set of natural neighbors of the cursor to compute the depth of the final cursor ray R1 (cursor depth).

Also, to determine the CD gain value for the 2D input device operating with an AR interface, the CD gain engine 115 can replace the specifications for the VR interface with specifications for the AR interface. For example, the CD gain engine 115 can replace the specifications for the VR headset with specifications for the AR headset. In this manner, the CD gain engine 115 can compute a CD gain that is optimized for a 2D input device that is utilized within an AR scene displayed on an AR headset.

In sum, a cursor position engine 113 is implemented to continually determine the 3D position of a cursor controlled by a 2D input device as the cursor moves within a 3D scene (such as a VR scene or AR scene) in a 3D environment (such as a virtual environment or augmented-reality environment). The 3D scene is displayed on a 3D display (such as a VR headset or AR headset). The cursor position engine 113 determines the 3D position of the cursor for a current frame of the 3D scene based, at least in part, on a current user viewpoint and a current mouse movement.

First, the cursor position engine 113 receives a previous cursor ray RP that is determined for a previous frame that is just prior to the current frame. The previous cursor ray RP originates at a previous user viewpoint and points in the direction of the previous cursor position in the previous frame. The cursor position engine 113 then updates the origin of the previous cursor ray RP based on the current user viewpoint to generate an initial cursor ray R0 for the current frame. The cursor position engine 113 then updates the direction of the initial cursor ray R0 based on a current mouse movement to generate a final cursor ray R1 for the current frame. In particular, an amount of angular movement (delta motion) is determined based on a current movement of the 2D input device (delta movement) and a CD gain value. The CD gain value can be a default value or a value that is calculated by the CD gain engine 115. The delta motion is then added to the initial cursor ray R0 to generate the final cursor ray R1 for the current frame.

Once the direction of the final cursor ray R1 for the current frame is determined, the cursor position engine 113 then determines the depth of the final cursor ray R1. To do so, the cursor position engine 113 casts the final cursor ray R1 into the 3D scene to determine if the final cursor ray R1 intersects with any selectable objects within the 3D scene. If so, the depth of the final cursor ray R1 is set to equal the depth of the intersected object. If no intersected object is found, the cursor position engine 113 performs an interpolation technique based on one or more selectable objects within the 3D scene to determine an interpolated depth of the final cursor ray R1. In some embodiments, the interpolation technique is performed to determine a set of selectable objects comprising natural neighbors of the cursor based on a Voronoi diagram. An interpolation algorithm, such as the Laplacian interpolation algorithm, is then applied to the set of natural neighbors to compute the depth of the final cursor ray R1.

Once the depth of the final cursor ray R1 for the current frame is determined, the cursor position engine 113 then determines the 3D position of the cursor within the current frame of the 3D scene based on the direction and depth of the final cursor ray R1. The current frame is then rendered and displayed on the 3D display, the current frame including a graphical image of the cursor located at the current 3D position within the 3D scene.

At least one technical advantage of the disclosed techniques relative to the prior art is that the disclosed techniques enable seamless integration of a 2D input device within a 3D environment. The disclosed techniques continually determine a depth of a cursor controlled by the 2D input device for each frame of a 3D environment displayed on a 3D display (such as a VR or AR headset). The depth of the cursor is determined based on locations of one or more 3D objects currently displayed within the 3D environment. In this manner, the disclosed techniques provide depth continuity of the cursor within the 3D environment, which enables smooth and continuous object selection and movement of the cursor within the 3D environment. Therefore, the disclosed techniques improve the efficiency with which users perform productive work and improve the overall user-experience relative to prior art systems. These technical advantages represent one or more technological improvements over prior art approaches.

In sum, the CD gain engine 115 is implemented to compute a control-display (CD) gain that is optimized for a 2D input device operating with a 3D interface (such as a VR interface or AR interface). In particular, the CD gain engine 115 is implemented to compute a CD gain optimized for a 2D input device utilized in a 3D environment that is displayed by a 3D display (such as an VR headset or AR headset). The CD gain engine 115 can determine the CD gain based, at least in part, on specifications for the 2D input device and the 3D display.

The CD gain engine 115 computes the CD gain by performing a viewing algorithm that determines a minimum object size (minimum angular size) of an object displayed in the 3D environment to be discernible (for an object comprising a graphic) or legible (for an object comprising a text character) to the human eye. The CD gain engine 115 then performs a gain algorithm that determines a range of CD gain values based on the minimum object size and specifications for the 2D input device and the 3D display. The range of CD gain values includes a minimum CD gain value and a maximum CD gain value. The CD gain engine 115 then selects a CD gain value between the range of CD gain values.

The CD gain engine 115 then transmits the CD gain value to the cursor position engine 113 for performing the disclosed techniques of the cursor position engine 113. In other embodiments, the CD gain value can be used in any 3D-based interface to map 2D device movements to corresponding cursor movements within a 3D environment displayed on a 3D display. In general, the techniques disclosed in relation to the cursor position engine 113 in Section II and the techniques disclosed in relation to the CD gain engine 115 in Section III can be performed separately and independently, or can be performed in conjunction.

At least one technical advantage of the disclosed techniques relative to the prior art is that the disclosed techniques provide a control display (CD) gain that is optimized for a 2D input device utilized in a 3D interface. The optimized CD gain is determined based on specifications for the 2D input device and the 3D display (such as a VR or AR headset) that displays the 3D environment. The disclosed techniques provide a CD gain which reduces over-clutching of the 2D input device while maintaining a satisfactory level of precision of the 2D input device. In this manner, the disclosed techniques enable efficient and accurate object selection and movement of the cursor within the 3D environment. Therefore, the disclosed techniques improve the efficiency with which users perform productive work and improve the overall user-experience relative to prior art systems. These technical advantages represent one or more technological improvements over prior art approaches.

Aspects of the subject matter described herein are set out in the following numbered clauses.

1. In some embodiments, a computer-implemented method for determining an optimized control-display (CD) gain for a two-dimensional (2D) input device operating with a three-dimensional (3D) display, the method comprising: determining a minimum object size displayable by the 3D display based on at least one specification of the 3D display; determining a range of CD gain values based on the minimum object size, at least one specification the 2D input device, and the at least one specification of the 3D display; selecting a CD gain value within the range of CD gain values; and determining a 3D position of a cursor within a 3D scene displayed on the 3D display based on the CD gain value, wherein the cursor is controlled by the 2D input device.

2. The computer-implemented method of clause 1, wherein determining the minimum object size comprises determining a minimum angular size of a graphic object displayed within the 3D display that is discernible.

3. The computer-implemented method of any of clauses 1-2, wherein determining the minimum object size comprises determining a minimum angular size of a character object displayed within the 3D display that is legible.

4. The computer-implemented method of any of clauses 1-3, wherein the at least one specification of the 3D display comprises a display resolution of the 3D display.

5. The computer-implemented method of any of clauses 1-4, wherein determining the range of CD gain values comprises determining a minimum CD gain value based on at least one specification of the 3D display.

6. The computer-implemented method of any of clauses 1-5, wherein determining the range of CD gain values comprises determining a minimum CD gain value based on a ratio between a field of view of the 3D display and a physical operating range of the 2D input device.

7. The computer-implemented method of any of clauses 1-6, wherein determining the range of CD gain values comprises determining a device-precision CD gain based on a resolution of the 2D input device.

8. The computer-implemented method of any of clauses 1-7, wherein determining the range of CD gain values comprises determining a hand-precision CD gain based on a minimal input movement performed by a human hand.

9. The computer-implemented method of any of clauses 1-8, wherein determining the range of CD gain values comprises setting a maximum CD gain value equal to a lesser of the device-precision CD gain and the hand-precision CD gain.

10. In some embodiments, one or more non-transitory computer-readable media including instructions that, when executed by one or more processors, cause the one or more processors to determine an optimized control-display (CD) gain for a two-dimensional (2D) input device operating with a three-dimensional (3D) display, by performing the steps of: determining a minimum object size displayable by the 3D display based on at least one specification of the 3D display; determining a range of CD gain values based on the minimum object size, at least one specification the 2D input device, and the at least one specification of the 3D display; selecting a CD gain value within the range of CD gain values; and determining a 3D position of a cursor within a 3D scene displayed on the 3D display based on the CD gain value, wherein the cursor is controlled by the 2D input device.

11. The one or more non-transitory computer-readable media of clause 10, wherein determining the range of CD gain values comprises determining a minimum CD gain value based on at least one specification of the 3D display.

12. The one or more non-transitory computer-readable media of any of clauses 10-11, wherein determining the range of CD gain values comprises determining a minimum CD gain value based on a ratio between a field of view of the 3D display and a physical operating range of the 2D input device.

13. The one or more non-transitory computer-readable media of any of clauses 10-12, wherein selecting the CD gain value within the range of CD gain values comprises selecting a CD gain value approximately in a middle of the range of CD gain values.

14. The one or more non-transitory computer-readable media of any of clauses 10-13, wherein the 3D display comprises a virtual-reality (VR) headset, and the 3D scene comprises a VR scene that includes one or more virtual objects.

15. The one or more non-transitory computer-readable media of any of clauses 10-14, wherein the 3D display comprises an augmented-reality (AR) headset, and the 3D scene comprises an AR scene that includes at least one virtual object and at least one real-world object.

16. In some embodiments, a workstation comprising: a memory that includes instructions; and at least one processor that is coupled to the memory and, upon executing the instructions, determine an optimized control-display (CD) gain for a two-dimensional (2D) input device operating with a three-dimensional (3D) display, by performing the steps of: determining a minimum object size displayable by the 3D display based on at least one specification of the 3D display; determining a range of CD gain values based on the minimum object size, at least one specification the 2D input device, and the at least one specification of the 3D display; selecting a CD gain value within the range of CD gain values; and determining a 3D position of a cursor within a 3D scene displayed on the 3D display based on the CD gain value, wherein the cursor is controlled by the 2D input device.

17. The workstation of clause 16, wherein determining the range of CD gain values comprises determining a minimum CD gain value based on at least one specification of the 3D display.

18. The workstation of any of clauses 16-17, wherein selecting the CD gain value within the range of CD gain values comprises selecting a CD gain value approximately in a middle of the range of CD gain values.

19. The workstation of any of clauses 16-18, further comprising: the 3D display comprising a virtual-reality (VR) headset, wherein the 3D scene comprises a VR scene that includes one or more virtual objects.

20. The workstation of any of clauses 16-19, further comprising: the 3D display comprising an augmented-reality (AR) headset, wherein the 3D scene comprises an AR scene that includes at least one virtual object and at least one real-world object.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module" or "system." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, non-transitory, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for determining an optimized control-display (CD) gain for a two-dimensional (2D) input device operating with a three-dimensional (3D) display, the method comprising:
   determining a minimum object size displayable by the 3D display based on at least one specification of the 3D display;
   determining a range of CD gain values based on the minimum object size, at least one specification the 2D input device, and the at least one specification of the 3D display;
   selecting a CD gain value within the range of CD gain values; and
   determining a 3D position of a cursor within a 3D scene displayed on the 3D display based on the CD gain value, wherein the cursor is controlled by the 2D input device.

2. The computer-implemented method of claim 1, wherein determining the minimum object size comprises determining a minimum angular size of a graphic object displayed within the 3D display that is discernible.

3. The computer-implemented method of claim 1, wherein determining the minimum object size comprises determining a minimum angular size of a character object displayed within the 3D display that is legible.

4. The computer-implemented method of claim 1, wherein the at least one specification of the 3D display comprises a display resolution of the 3D display.

5. The computer-implemented method of claim 1, wherein determining the range of CD gain values comprises determining a minimum CD gain value based on at least one specification of the 3D display.

6. The computer-implemented method of claim 1, wherein determining the range of CD gain values comprises determining a minimum CD gain value based on a ratio between a field of view of the 3D display and a physical operating range of the 2D input device.

7. The computer-implemented method of claim 1, wherein determining the range of CD gain values comprises determining a device-precision CD gain based on a resolution of the 2D input device.

8. The computer-implemented method of claim 7, wherein determining the range of CD gain values comprises determining a hand-precision CD gain based on a minimal input movement performed by a human hand.

9. The computer-implemented method of claim 8, wherein determining the range of CD gain values comprises setting a maximum CD gain value equal to a lesser of the device-precision CD gain and the hand-precision CD gain.

10. One or more non-transitory computer-readable media including instructions that, when executed by one or more processors, cause the one or more processors to determine an optimized control-display (CD) gain for a two-dimensional (2D) input device operating with a three-dimensional (3D) display, by performing the steps of:
    determining a minimum object size displayable by the 3D display based on at least one specification of the 3D display;
    determining a range of CD gain values based on the minimum object size, at least one specification the 2D input device, and the at least one specification of the 3D display;
    selecting a CD gain value within the range of CD gain values; and
    determining a 3D position of a cursor within a 3D scene displayed on the 3D display based on the CD gain value, wherein the cursor is controlled by the 2D input device.

11. The one or more non-transitory computer-readable media of claim 10, wherein determining the range of CD gain values comprises determining a minimum CD gain value based on at least one specification of the 3D display.

12. The one or more non-transitory computer-readable media of claim 10, wherein determining the range of CD gain values comprises determining a minimum CD gain value based on a ratio between a field of view of the 3D display and a physical operating range of the 2D input device.

13. The one or more non-transitory computer-readable media of claim 10, wherein selecting the CD gain value within the range of CD gain values comprises selecting a CD gain value approximately in a middle of the range of CD gain values.

14. The one or more non-transitory computer-readable media of claim 10, wherein the 3D display comprises a virtual-reality (VR) headset, and the 3D scene comprises a VR scene that includes one or more virtual objects.

15. The one or more non-transitory computer-readable media of claim 10, wherein the 3D display comprises an augmented-reality (AR) headset, and the 3D scene comprises an AR scene that includes at least one virtual object and at least one real-world object.

16. A workstation comprising:
a memory that includes instructions; and
at least one processor that is coupled to the memory and, upon executing the instructions, determine an optimized control-display (CD) gain for a two-dimensional (2D) input device operating with a three-dimensional (3D) display, by performing the steps of:
determining a minimum object size displayable by the 3D display based on at least one specification of the 3D display;
determining a range of CD gain values based on the minimum object size, at least one specification the 2D input device, and the at least one specification of the 3D display;
selecting a CD gain value within the range of CD gain values; and
determining a 3D position of a cursor within a 3D scene displayed on the 3D display based on the CD gain value, wherein the cursor is controlled by the 2D input device.

17. The workstation of claim 16, wherein determining the range of CD gain values comprises determining a minimum CD gain value based on at least one specification of the 3D display.

18. The workstation of claim 16, wherein selecting the CD gain value within the range of CD gain values comprises selecting a CD gain value approximately in a middle of the range of CD gain values.

19. The workstation of claim 16, further comprising:
the 3D display comprising a virtual-reality (VR) headset, wherein the 3D scene comprises a VR scene that includes one or more virtual objects.

20. The workstation of claim 16, further comprising:
the 3D display comprising an augmented-reality (AR) headset, wherein the 3D scene comprises an AR scene that includes at least one virtual object and at least one real-world object.

* * * * *